(12) United States Patent
Elsherif et al.

(10) Patent No.: US 12,267,726 B2
(45) Date of Patent: Apr. 1, 2025

(54) MANAGED MU-MIMO ENABLEMENT FOR REAL-WORLD APPLICATIONS

(71) Applicant: QUALCOMM Incorporated, San Diego, CA (US)

(72) Inventors: Ahmed Ragab Elsherif, San Jose, CA (US); Nicholas Kucharewski, San Jose, CA (US); Simon Jan Brand, Pleasanton, CA (US); Srinivas Katar, Fremont, CA (US); Xiaolong Huang, San Jose, CA (US); Sandip Homchaudhuri, San Jose, CA (US); Nathaniel David Houghton, El Cerrito, CA (US); Aravind Seetharaman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/722,564

(22) Filed: Apr. 18, 2022

(65) Prior Publication Data
US 2023/0337059 A1    Oct. 19, 2023

(51) Int. Cl.
*H04W 28/10* (2009.01)
*H04B 7/0452* (2017.01)
(Continued)

(52) U.S. Cl.
CPC .......... *H04W 28/10* (2013.01); *H04B 7/0452* (2013.01); *H04W 28/24* (2013.01); *H04W 84/12* (2013.01)

(58) Field of Classification Search
CPC ..... H04W 28/10; H04W 28/24; H04W 84/12; H04B 7/0452; H04B 7/0689
See application file for complete search history.

(56) References Cited

U.S. PATENT DOCUMENTS 11,051,320 B1 *   6/2021   Siraj ..................... H04L 47/803
11,356,133 B1 *   6/2022   Hasnain ................ H04L 25/022
(Continued)

FOREIGN PATENT DOCUMENTS

WO    WO-2014055211 A1    4/2014
WO    WO-2016126383 A1    8/2016

OTHER PUBLICATIONS

International Search Report and Written Opinion—PCT/US2023/016072—ISA/EPO—Jun. 23, 2023.

*Primary Examiner* — Yu-Wen Chang
(74) *Attorney, Agent, or Firm* — Holland & Hart LLP

(57) ABSTRACT

Systems and methods for selectively enabling multi-user (MU) communications are disclosed. In some implementations, an access point (AP) obtains packets associated with a traffic flow, and obtains at least one of service-level agreement (SLA) parameters associated with the traffic flow, attributes of the traffic flow, or network parameters associated with a basic service set (BSS) that includes the AP. The AP provides an indication of whether the traffic flow is suitable for transmission as a single-user (SU) multiple-input multiple output (MIMO) (SU-MIMO) communication, as an MU-MIMO communication, as an orthogonal frequency division multiple access (OFDMA) communication, or as a partial bandwidth (BW) MU-MIMO communication to a WLAN subsystem of the AP, the indication being based on one or more of the SLA parameters, the traffic flow attributes, or the network parameters. The AP initiates transmission of the one or more packets based on the indication.

23 Claims, 19 Drawing Sheets

(51) Int. Cl.
*H04W 28/24* (2009.01)
*H04W 84/12* (2009.01)

(56) References Cited

U.S. PATENT DOCUMENTS

| | | | |
|---|---|---|---|
| 2011/0150004 A1 | 6/2011 | Denteneer et al. | |
| 2015/0245360 A1 | 8/2015 | Gao et al. | |
| 2017/0373789 A1* | 12/2017 | Huang | H04B 7/0632 |
| 2018/0007712 A1* | 1/2018 | Lou | H04W 74/006 |
| 2020/0037233 A1* | 1/2020 | Taneja | H04W 48/16 |
| 2021/0099212 A1* | 4/2021 | Huang | H04B 7/0452 |
| 2022/0200924 A1* | 6/2022 | Lu | H04L 47/2433 |
| 2022/0317241 A1* | 10/2022 | Aduru | H04W 16/14 |

* cited by examiner

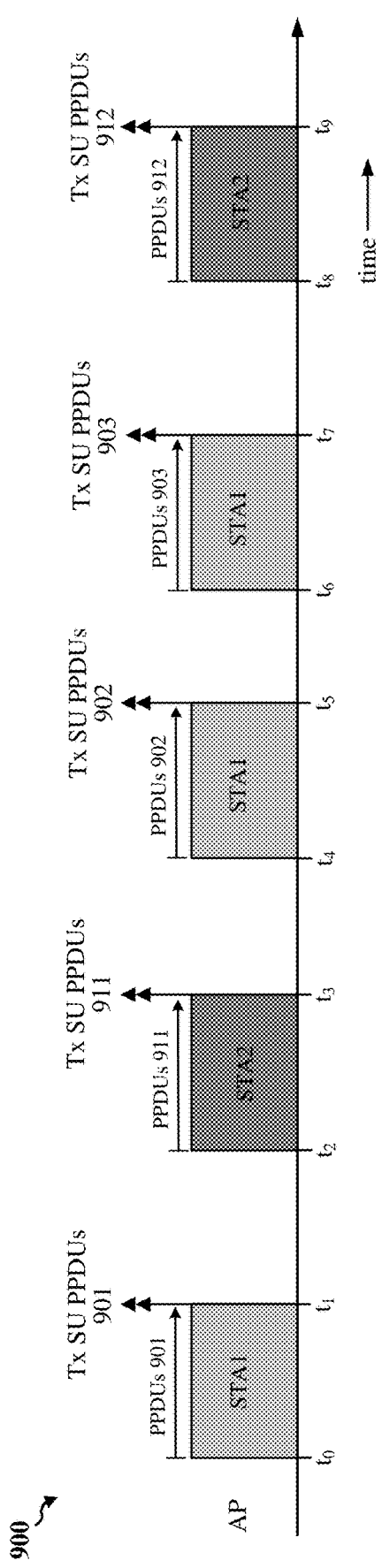
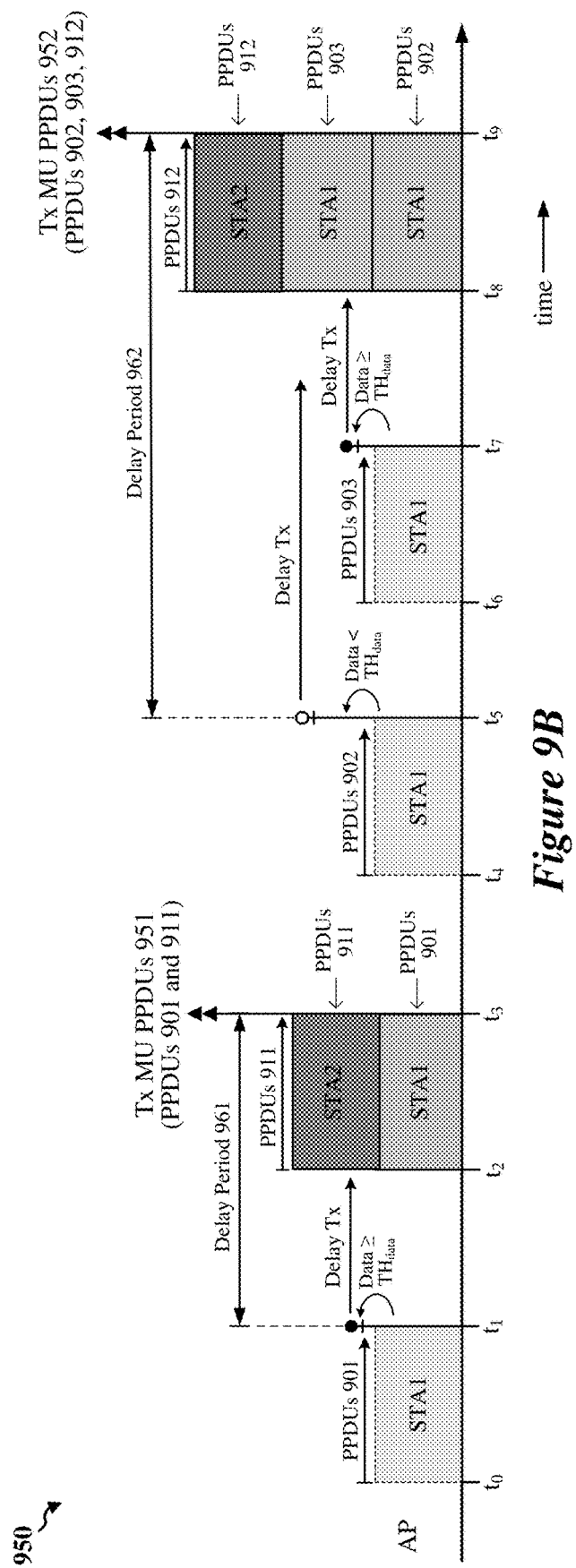
Figure 9A
Figure 9B

1330

1332
Output for transmission the one or more packets as an MU-MIMO transmission based at least in part on the interference levels being less than an interference threshold, the channel delay spread being less than a threshold amount, or both.

1334
Output for transmission the one or more packets as an OFDMA transmission based at least in part on the interference levels being at least equal to the interference threshold, the channel delay spread being at least equal to the threshold amount, or both.

1342
Output for transmission the one or more packets as an MU-MIMO transmission based on the respective interarrival times being offset in time from each other by less than a threshold time period and the average burst size being at least equal to a burst size threshold.

1344
Output for transmission the one or more packets as an OFDMA transmission based on the respective interarrival times being offset in time from each other by more than the threshold time period and the average burst size being less than the burst size threshold.

*Figure 13E*

MANAGED MU-MIMO ENABLEMENT FOR REAL-WORLD APPLICATIONS

TECHNICAL FIELD

This disclosure relates generally to wireless communication, and more specifically, to dynamically enabling multi-user (MU) communications for traffic flows transmitted over a wireless medium.

DESCRIPTION OF THE RELATED TECHNOLOGY

A wireless local area network (WLAN) may be formed by one or more access points (APs) that provide a shared wireless medium for use by a number of client devices such as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP in beacon frames periodically broadcasted over the wireless medium so that STAs within wireless range of the AP can associate with the AP and establish a wireless communication link with the WLAN.

An AP may determine a transmission mode for each traffic flow that is communicated over the wireless medium. Example transmission modes may include single-user (SU) multiple-input multiple-output (MIMO) (SU-MIMO) transmissions, multi-user (MU) MIMO (MU-MIMO) transmissions, and orthogonal frequency division multiple access (OFDMA) communications. Some APs rely on feedback information from their respective wireless networks to determine the transmission modes for transmitting traffic flows over the wireless medium. The process by which an AP determines the transmission mode of a traffic flow based on feedback from its network may be referred to as a "control loop." As wireless networks continue to grow, and wireless technologies continue to evolve, new mechanisms are needed to ensure that various control loops can converge on transmission mode decisions that are optimized for communications between wireless devices in the network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented as an apparatus for wireless communications. The apparatus may include at least a wireless local area network (WLAN) subsystem and a resource manager. The WLAN subsystem is configured to obtain one or more packets associated with a traffic flow. The resource manager is configured to obtain at least one of one or more service-level agreement (SLA) parameters of the traffic flow, one or more attributes of the traffic flow, or one or more network parameters associated with a basic service set (BSS) that includes the apparatus. The resource manager is also configured to provide an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) MU-MIMO communication, the indication being based on one or more of the SLA parameters, the traffic flow attributes, or the network parameters. The WLAN subsystem is also configured to initiate transmission of the one or more packets over the wireless medium using a transmission mode based on the indication provided by the resource manager.

In various implementations, the resource manager may also be configured to assign a transmission mode to each packet queue associated with the traffic flow, the transmission mode being one of SU-MIMO, MU-MIMO, OFDMA, or partial BW MU-MIMO based on the indication. In some instances, the WLAN subsystem may also be configured to select the transmission mode for the one or more packets based on the indication. In some instances, the WLAN subsystem outputs for transmission the one or more packets as an MU-MIMO transmission based on the traffic flow being associated with latency-sensitive traffic and an amount of payload data carried by the one or more packets being at least equal to a threshold, or outputs for transmission the one or more packets as an OFDMA transmission based on the traffic flow being associated with latency-sensitive traffic and the amount of payload data carried by the one or more packets being less than the threshold. In other instances, the WLAN subsystem outputs for transmission the one or more packets as a partial BW MU-MIMO transmission based on the traffic flow being associated with latency-sensitive traffic and the number of active latency-sensitive traffic flows being at least equal to a threshold number of traffic flows, or outputs for transmission the one or more packets as an MU-MIMO transmission based on the traffic flow not being associated with latency-sensitive traffic and carrying more than a specified amount of data.

In some implementations, the SLA parameters may include one or more of a minimum data rate, a maximum delay bound, a service interval, a burst size, or a throughput requirement for traffic flows associated with the SLA. In some aspects, the WLAN subsystem outputs for transmission the one or more packets as an MU-MIMO transmission based at least in part on the maximum delay bound being at least equal to a delay threshold, the throughput requirement being at least equal to a throughput threshold, or both, or outputs for transmission the one or more packets as an OFDMA transmission based at least in part on the maximum delay bound being less than the delay threshold, the throughput requirement being less than the throughput threshold, or both. In some instances, the output for transmission as the MU-MIMO transmission may also be based on the minimum data rate being at least equal to a data rate threshold, and the output for transmission as the OFDMA transmission may also be based on the minimum data rate being less than the data rate threshold.

In various implementations, the network parameters may include one or more of interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium. In some aspects, the WLAN subsystem outputs for transmission the one or more packets as an MU-MIMO transmission based at least in part on the interference levels being less than an interference threshold, the level of channel delay spread being less than a threshold amount, or both. In other aspects, the WLAN subsystem outputs for transmission the one or more packets as an OFDMA transmission based at least in part on the interference levels being at least equal to the interference threshold, the level of channel delay spread being at least equal to the threshold amount, or both. In some instances, the output for transmission as the MU-MIMO transmission may also be based on the number or percentage of active STAs that support MU-MIMO communications being at least equal to a first amount and the number of associated STAs being less than a second amount. In other instances, the output for transmission as the SU-MIMO or OFDMA transmission may also be based on the number or percentage of active STAs that support MU-MIMO communications being less than the first amount and the number of associated STAs being at least equal to the second amount.

In some implementations, the traffic flow attributes may include one or more of a data rate of the traffic flow, an average burst size of the traffic flow, or interarrival times of the one or more packets associated with the traffic flow. In some aspects, the WLAN subsystem outputs for transmission the one or more packets as an MU-MIMO transmission based on the respective interarrival times being offset in time from each other by less than a threshold time period and the average burst size being at least equal to a burst size threshold, or outputs for transmission the one or more packets as an SU-MIMO or OFDMA transmission based on the respective interarrival times being offset in time from each other by more than the threshold time period and the average burst size being less than the burst size threshold. In some instances, the output for transmission as the MU-MIMO transmission may also be based on the data rate being at least equal to a data rate threshold. In other instances, the output for transmission as the OFDMA transmission may also be based on the data rate being less than the data rate threshold.

In various aspects, the resource manager operates according to a first timing loop, and the WLAN subsystem operates according to a second timing loop, where the first timing loop is between approximately 1 and 100 milliseconds, and the second timing loop is between approximately 1 and 5 seconds. In some aspects, the resource manager is configured to obtain the network parameters and the traffic flow attributes based on a third timing loop, where the third timing loop is between approximately 10 and 60 seconds. In other aspects, the apparatus may also include a transceiver configured to transmit the one or more packets over the wireless medium. In some implementations, the apparatus may be configured as an access point (AP) associated with the BSS.

Another innovative aspect of the subject matter described in this disclosure can be implemented as a method for wireless communication at an access point (AP). The method may include obtaining one or more packets associated with a traffic flow, and obtaining at least one of one or more SLA parameters of the traffic flow, one or more attributes of the traffic flow, or one or more network parameters associated with a BSS that includes the AP. The method may include providing an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial BW MU-MIMO communication, the indication being based on one or more of the SLA parameters, the traffic flow attributes, or the network parameters. The method may include initiating transmission of the one or more packets over the wireless medium based on the indication.

In various implementations, the method may also include assigning a transmission mode to each packet queue associated with the traffic flow, the transmission mode being one of an SU-MIMO, MU-MIMO, OFDMA, or partial BW MU-MIMO based on the indication. In some aspects, the method may also include selecting a transmission mode for the WLAN subsystem based on the indication. In some instances, the method may also include outputting for transmission the one or more packets as an MU-MIMO transmission based on the traffic flow being associated with latency-sensitive traffic and an amount of payload data carried by the one or more packets being at least equal to a threshold, or outputting for transmission the one or more packets as an OFDMA transmission based on the traffic flow being associated with latency-sensitive traffic and the amount of payload data carried by the one or more packets being less than the threshold. In other instances, the WLAN subsystem outputs for transmission the one or more packets as a partial BW MU-MIMO transmission based on the traffic flow being associated with latency-sensitive traffic and the number of active latency-sensitive traffic flows being at least equal to a threshold number of traffic flows, or outputs for transmission the one or more packets as an MU-MIMO transmission based on the traffic flow not being associated with latency-sensitive traffic and carrying more than a specified amount of data.

In some implementations, the SLA parameters may include one or more of a minimum data rate, a maximum delay bound, a service interval, a burst size, or a throughput requirement for traffic flows associated with the SLA. In some aspects, the method may also include outputting for transmission the one or more packets as an MU-MIMO transmission based at least in part on the maximum delay bound being at least equal to a delay threshold, the throughput requirement being at least equal to a throughput threshold, or both, or outputting for transmission the one or more packets as an OFDMA transmission based at least in part on the maximum delay bound being less than the delay threshold, the throughput requirement being less than the throughput threshold, or both. In some instances, outputting the one or more packets for transmission as the MU-MIMO transmission may also be based on the minimum data rate being at least equal to a data rate threshold. In other instances, outputting the one or more packets for transmission as the OFDMA transmission may also be based on the minimum data rate being less than the data rate threshold.

In various implementations, the network parameters may include one or more of interference levels on the wireless medium, a level of channel delay spread associated with the wireless medium, a number of associated STAs that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium. In some aspects, the method may also include outputting for transmission the one or more packets as an MU-MIMO transmission based at least in part on the interference levels being less than an interference threshold, the level of channel delay spread being less than a threshold amount, or both. In other aspects, the method may also include outputting for transmission the one or more packets as an OFDMA transmission based at least in part on the interference levels being at least equal to the interference threshold, the level of channel delay spread being at least equal to the threshold amount, or both. In some instances, outputting the one or more packets for transmission as the MU-MIMO transmission may also be based on the number or percentage of active STAs that support MU-MIMO communications being at least equal to a first amount and the number of active STAs being less than a second amount. In other instances, outputting the one or more packets for transmission as the SU-MIMO or OFDMA transmission may also be based on the number or percentage of active STAs that support MU-MIMO communications being less than the first amount and the number of active STAs being at least equal to the second amount.

In some implementations, the traffic flow attributes may include one or more of a data rate of the traffic flow, an average burst size of the traffic flow, or interarrival times of the one or more packets associated with the traffic flow. In some aspects, the method may also include outputting for transmission the one or more packets as the MU-MIMO transmission based on the respective interarrival times being offset in time from each other by less than a threshold time period and the average burst size being greater than a burst size threshold. In other aspects, the method may also include outputting for transmission the one or more packets as the SU-MIMO or OFDMA transmission based on the respective interarrival times being offset in time from each other by more than the threshold time period and the average burst size being less than the burst size threshold. In some instances, outputting the one or more packets for transmission as the MU-MIMO transmission may also be based on the data rate being at least equal to a data rate threshold. In other instances, outputting the one or more packets for transmission as the OFDMA transmission may also be based on the data rate being less than the data rate threshold.

In various aspects, obtaining the SLA parameters may be associated with a first timing loop, and providing the indication may be associated with a second timing loop, where the first timing loop is between approximately 1 and 100 milliseconds, and the second timing loop is between approximately 1 and 5 seconds. In some instances, obtaining the network parameters and the traffic flow attributes may be associated with a third timing loop, the third timing loop being between approximately 10 and 60 seconds.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 9A shows a timing diagram depicting an example wireless communication that supports single-user (SU) multiple-input multiple output (MIMO) (SU-MIMO) communications.

FIG. 9B shows a timing diagram depicting an example wireless communication that supports multi-user (MU) MIMO (MU-MIMO) communications.

FIGS. 13A-13E show flowcharts illustrating example operations for wireless communication that supports selectively enabling MU-MIMO communications, according to some implementations.

Like reference numbers and designations in the various drawings indicate like elements.

DETAILED DESCRIPTION

Figure 1:
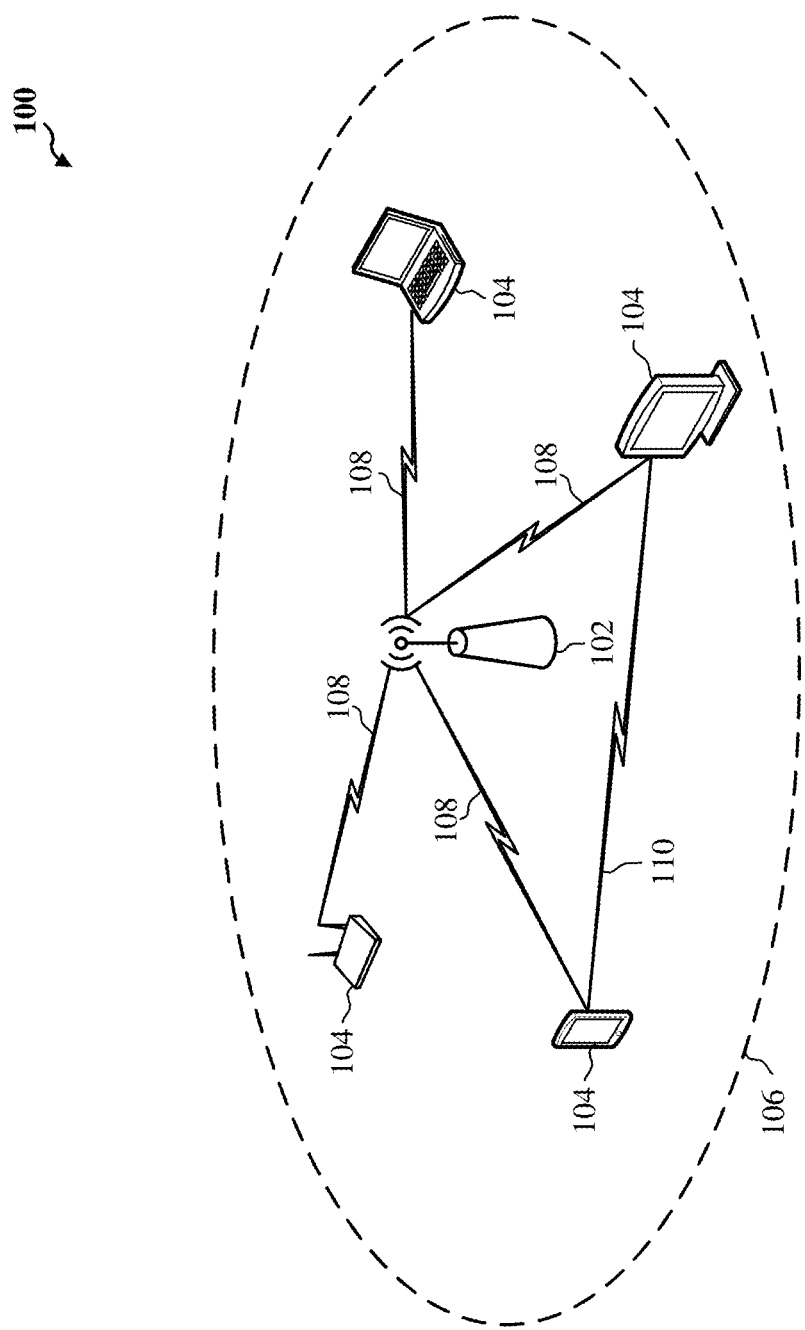
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

As discussed, a "control loop" may refer to a process by which an AP selects or determines the transmission mode for transmitting traffic flows over a wireless network based on feedback obtained from the wireless network. In many APs, timing aspects of the control loop are based on decision or response times associated with their transceivers. For example, a transceiver may be configured to make decisions pertaining to just-in-time (JIT) scheduling and smart enhanced distributed channel access (EDCA) adjustments, among other examples, within a defined time period. This defined time period may be associated with a period or duration of the control loop, for example, such that the feedback may be obtained from the wireless network based on the decision times of the transceivers. However, selecting or determining the transmission mode of traffic flows communicated over a wireless network based on feedback associated with transceiver decision or response times may fail to consider various network parameters, traffic patterns, and other network metrics observed over longer periods of time.

Various aspects of the subject matter disclosed herein relate generally to transmission modes used for transmitting multiple traffic flows over a wireless medium, and more particularly, to selecting or adjusting the transmission modes based on feedback information obtained from one or more wireless networks, one or more attributes of the traffic flows, one or more service-level agreement (SLA) parameters of the traffic flows, or any combination thereof. In various implementations, an apparatus, such as an AP, may select single-user (SU) multiple-input multiple output (MIMO) (SU-MIMO), multi-user (MU) MIMO (MU-MIMO), orthogonal frequency division multiple access (OFDMA), or partial BW MU-MIMO as the transmission mode for transmitting one or more traffic flows over the wireless medium. In some instances, the apparatus may include a resource manager that provides an indication of whether a respective traffic flow is suitable for transmission over the wireless medium using SU-MIMO, MU-MIMO, OFDMA, or partial BW MU-MIMO communications. The apparatus may also include a wireless local area network (WLAN) subsystem configured to initiate the transmission of one or more traffic flows over the wireless medium based on the indication provided by the resource manager.

The indication may be based on one or more of the feedback information, the traffic flow attributes, or the SLA parameters. In some implementations, the feedback information may include network parameters, traffic patterns, and other information pertaining to one or more wireless networks (including the wireless network operated by the apparatus). In some instances, the network parameters may include one or more of interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium. The SLA parameters may include one or more of a minimum data rate, a maximum delay bound, a service interval, a burst size, or a throughput requirement for traffic flows associated with the SLA. The traffic flow attributes may include at least a data rate of a respective traffic flow, an average burst size of the respective traffic flow, and interarrival times of packets associated with the respective traffic flow.

In some instances, the network parameters and the traffic flow attributes may be obtained based on a slow control loop having relatively slow decision times, and the transmission of traffic flows over the wireless medium may be based on a fast control loop having relatively fast decision times. In some aspects, the transmission mode indications provided by the resource manager may be based on a mid-control loop having decision times that are faster than the relatively slow decision times of the slow control loop, and that are slower than the relatively fast decision times of the fast control loop. In this way, aspects of the present disclosure may provide hierarchical levels of control for selecting or adjusting the transmission modes used for transmitting multiple traffic flows over the wireless medium in a manner that can increase network throughput and/or reduce network latencies (such as compared to conventional techniques based on a single control loop).

Aspects of the present disclosure recognize that MU-MIMO communications may achieve greater throughput and lower latencies than SU-MIMO communications by concurrently transmitting packets associated with multiple traffic flows to different users. Although OFDMA can also be used to concurrently transmit packets associated with multiple traffic flows to different users, OFDMA communications accommodate multiple users by allocating different frequency resources to each of the multiple traffic flows, thereby limiting each traffic flow of the multiple traffic flows to a corresponding portion of the bandwidth of the wireless network. In contrast to OFDMA communications, MU-MIMO communications accommodate multiple users by using spatial diversity techniques to distinguish between multiple traffic flows concurrently transmitted over the wireless medium, thereby allowing the transmission of each traffic flow of the multiple traffic flows to occupy the full bandwidth of the wireless network. As such, for at least some environments, MU-MIMO communications may achieve higher throughput and lower latencies than OFDMA communications.

Aspects of the present disclosure recognize that network throughput and latencies achieved by MU-MIMO communications may depend on a variety of factors including (but not limited to) interference levels on the wireless medium, channel delay spread associated with the wireless medium, the number of associated STAs that are active on the wireless medium, the number or percentage of active STAs that support MU-MIMO communications, channel correlation between multiple users, the amount of queued data for each traffic flow that is available for transmission, data rates of the traffic flows, burst sizes of the traffic flows, and burst periods of the traffic flows, among other examples. For example, any one or more of relatively high levels of channel correlation between a group of users, relatively high levels of interference, or relatively high levels of channel delay spread may decrease the ability of receiving devices to distinguish between the packets of different traffic flows concurrently transmitted over the wireless medium using MU-MIMO communications. As a result, MU-MIMO communications may not be suitable for transmitting multiple traffic flows over the wireless medium when one or more of these conditions are present. Therefore, in some implementations, the apparatus may disable MU-MIMO communications for transmitting multiple traffic flows over the wireless medium when one or more of the interference levels, channel correlations, or channel delay spread equals or exceeds one or more respective thresholds. In some instances, the apparatus may enable MU-MIMO communications for transmitting multiple traffic flows over the wireless medium when one or more of the interference levels, the channel correlations, or the channel delay spread is less than the one or more respective thresholds.

For another example, the apparatus may enable MU-MIMO communications for transmitting a group of traffic flows over the wireless medium when the number or percentage of active STAs that support MU-MIMO communications is relatively high (such as at least equal to a value), and may disable MU-MIMO communications for transmitting the traffic flows over the wireless medium when the number or percentage of active STAs that support MU-MIMO communications is relatively low (such as less than the value).

Aspects of the present disclosure also recognize that because the overhead of MU-MIMO communications is greater than the overhead of SU-MIMO communications (e.g., due to MU channel sounding, MU polling, and other frame exchanges associated with MU-MIMO communications), some traffic flows may not be suitable for transmission as an MU-MIMO communication unless the amount of queued downlink (DL) data of such the traffic flows is at least equal to a data threshold, for example, to compensate for the MU-MIMO overhead. As such, in some aspects, the apparatus may disable MU-MIMO communications for traffic flows having amounts of queued DL data that are less than the data threshold, and may enable MU-MIMO communications for traffic flows having amounts of queued DL data that equal or exceed the data threshold.

Particular implementations of the subject matter described in this disclosure can be implemented to realize one or more of the following potential advantages. By selecting the transmission modes used for transmitting multiple traffic flows over a wireless medium based on network parameters of one or more wireless networks, one or more traffic flow attributes, or one or more SLA parameters of the traffic flows, an apparatus configured according to various aspects of the present disclosure may concurrently transmit multiple traffic flows over the wireless medium based on a selection of one of SU-MIMO communications, MU-MIMO communications, OFDMA communications, or partial BW MU-MIMO communications that that maximizes network throughput and minimizes network latencies. In addition, the ability to dynamically adjust the transmission mode used for transmitting a respective traffic flow over the wireless medium based on one or more of the network parameters, the traffic flow attributes, or the respective SLA parameters may allow the apparatus to maintain network throughput and latencies when one or more network conditions change. Also, by using a hierarchical control loop to not only obtain network parameters and traffic flow attributes of one or more wireless networks, but also to make transmission mode decisions based at least in part on network parameters and traffic flow attributes observed over relatively long periods of time (e.g., as compared to the relatively short periods of time associated with decision and response times of PHY devices), which may increase the accuracy with which the apparatus determines the most suitable transmission for a particular traffic flow.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
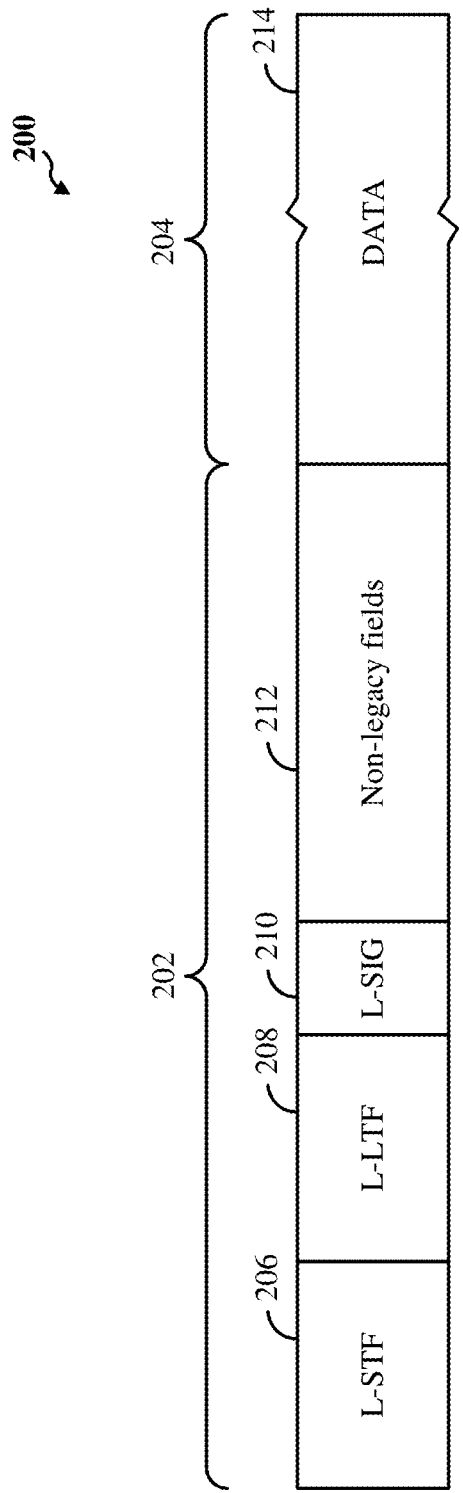
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
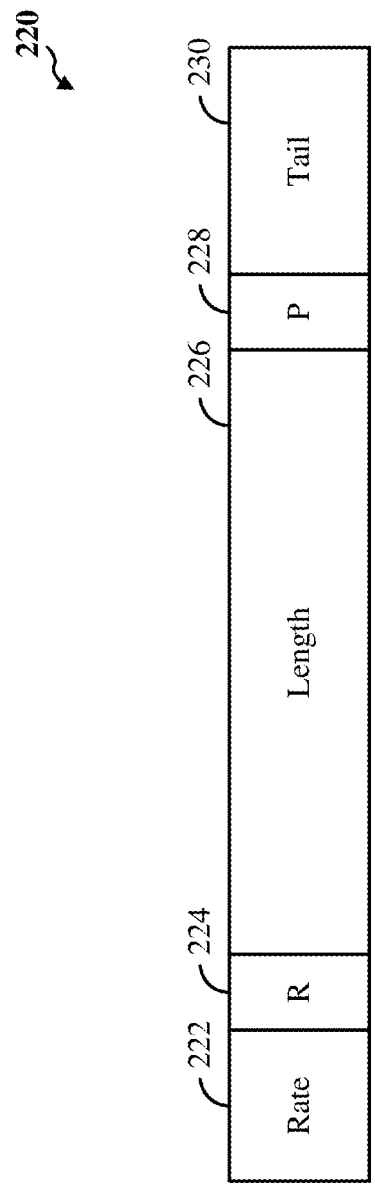
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
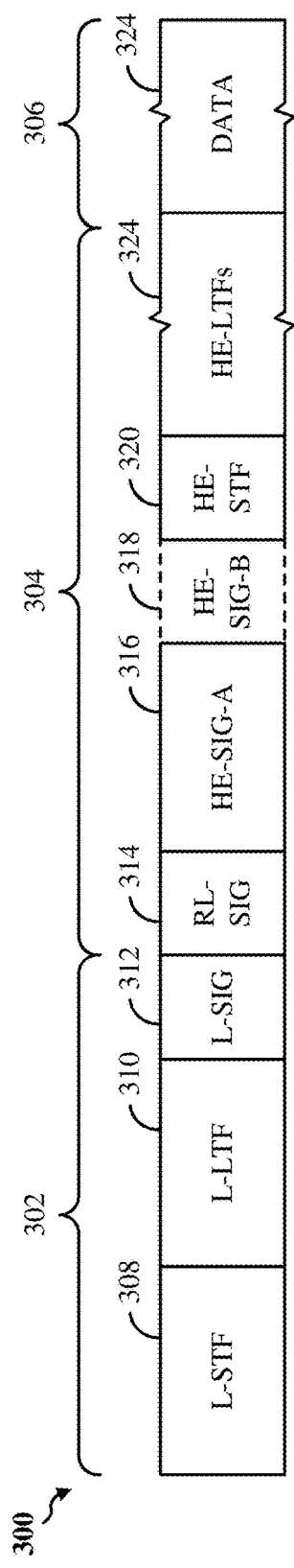
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL transmissions, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to partial BW MU-MIMO transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
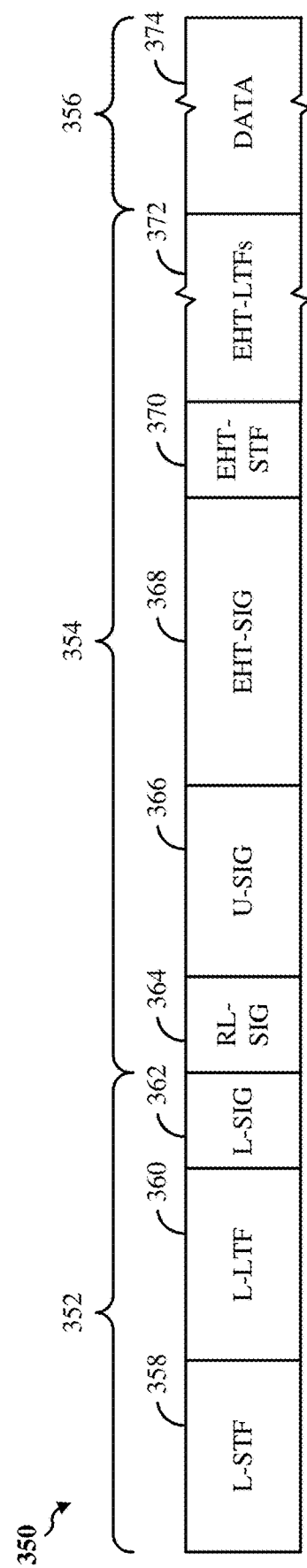
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may be used by a receiving device to interpret bits in the data field 376. In the context of DL transmissions, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to partial BW MU-MIMO transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
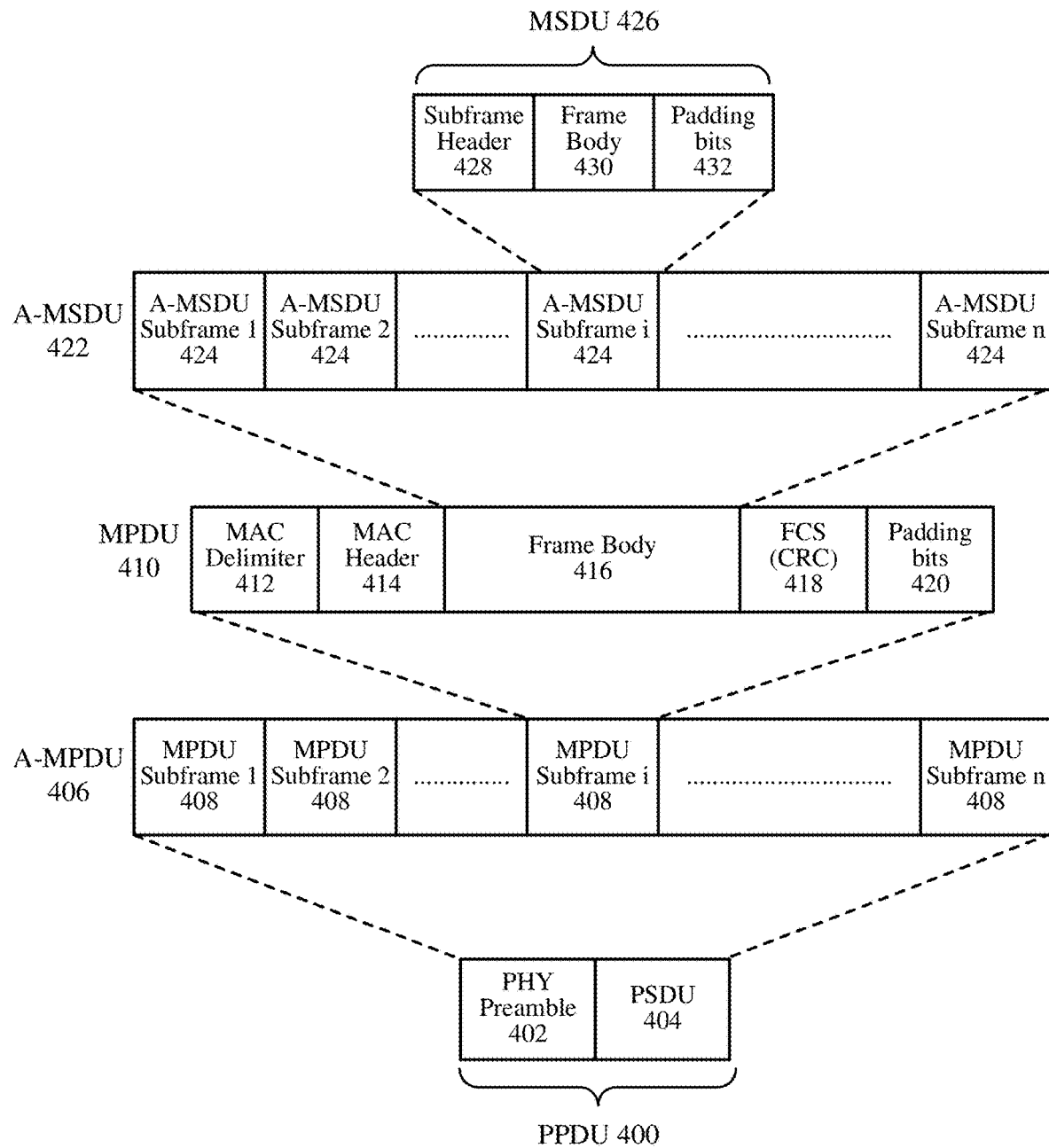
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and partial bandwidth (BW) MU-MIMO techniques.

In partial BW MU-MIMO schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL partial BW MU-MIMO or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
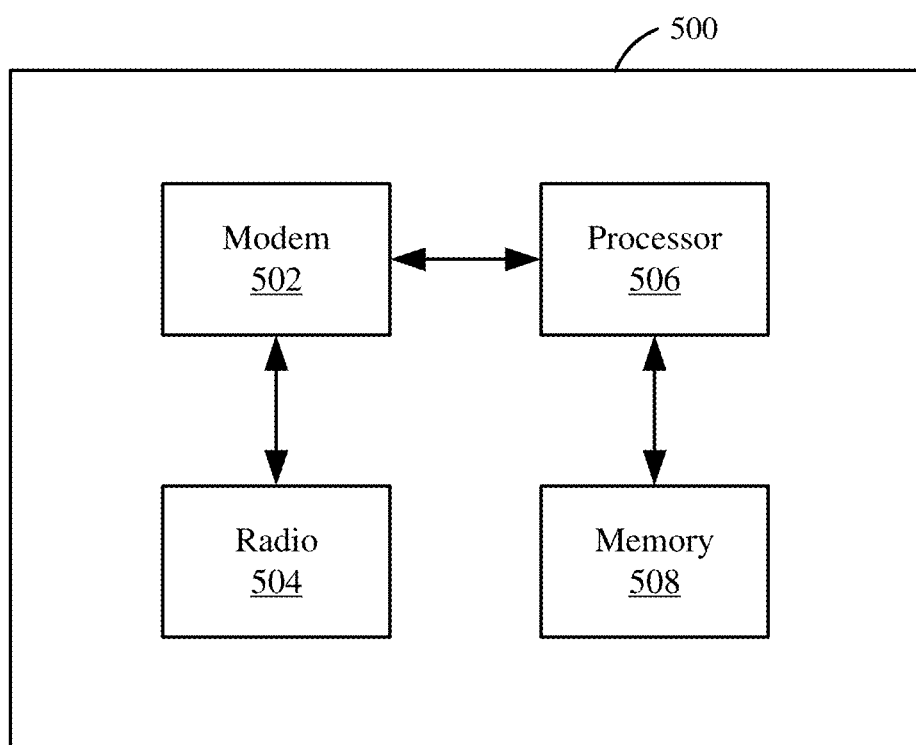
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
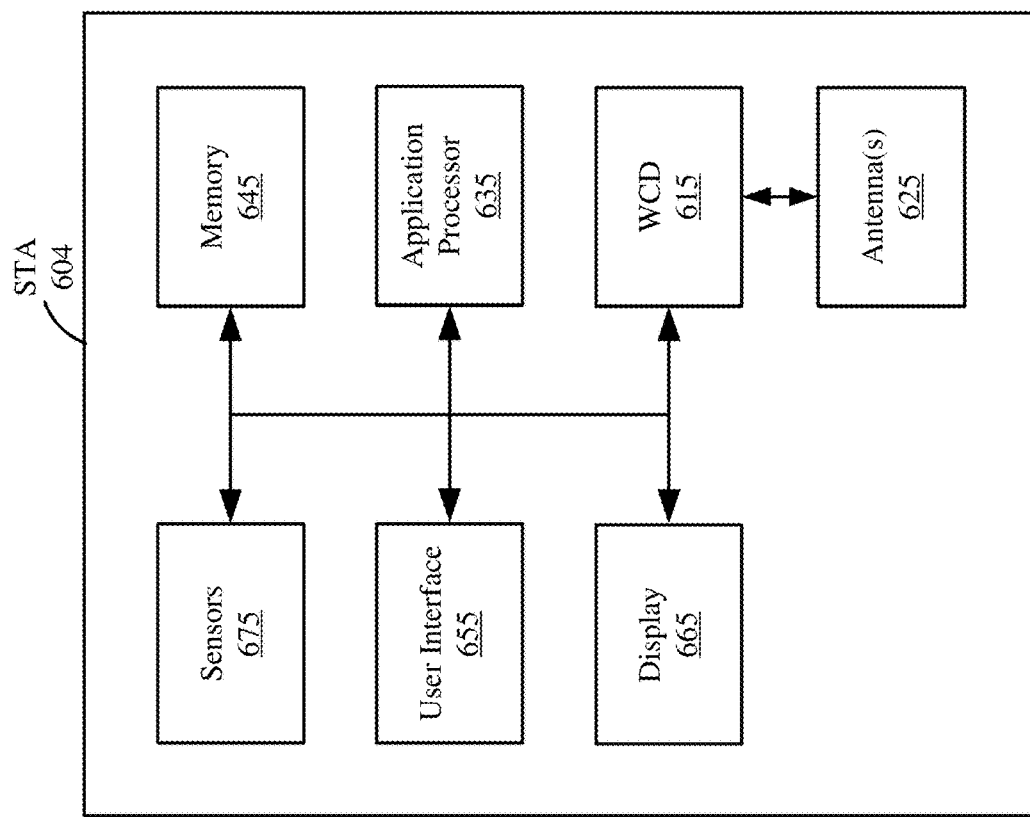
FIG. 6B shows a block diagram of an example station (STA).
Figure 6A:
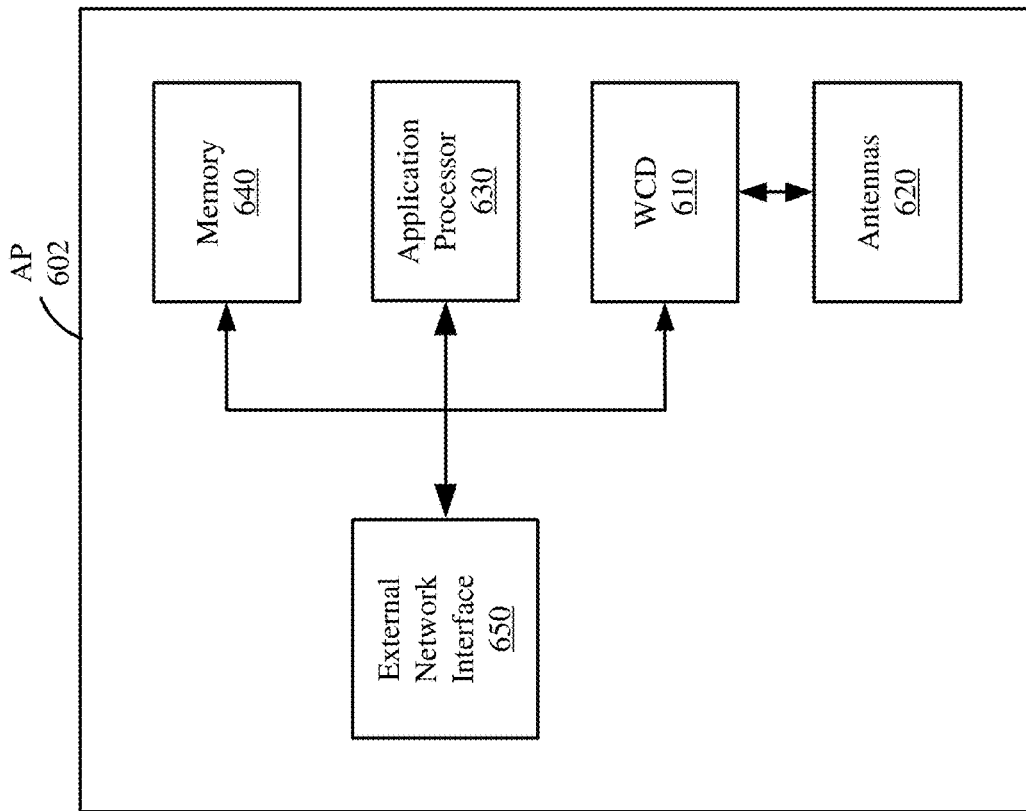
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As discussed, various aspects of the subject matter disclosed herein relate generally to transmission modes used for transmitting multiple traffic flows over a wireless medium, and more particularly, to selecting or adjusting the transmission modes based on feedback information obtained from one or more wireless networks, one or more attributes of the traffic flows, one or more SLA parameters of the traffic flows, or any combination thereof. In some implementations, the feedback information may include network parameters, traffic patterns, and other information pertaining to one or more wireless networks (including the wireless network operated by the apparatus). In some instances, the network parameters may include one or more of interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium. The SLA parameters may include one or more of a minimum data rate, a maximum delay bound, a service interval, a burst size, or a throughput requirement for traffic flows associated with the SLA. The traffic flow attributes may include at least a data rate of a respective traffic flow, an average burst size of the respective traffic flow, and interarrival times of packets associated with the respective traffic flow.

In some instances, the network parameters and the traffic flow attributes may be obtained based on a slow control loop having relatively slow decision times, and the transmission of traffic flows over the wireless medium may be based on a fast control loop having relatively fast decision times. In some aspects, the transmission mode indications provided by the resource manager may be based on a mid-control loop having decision times that are faster than the relatively slow decision times of the slow control loop, and that are slower than the relatively fast decision times of the fast control loop. In this way, aspects of the present disclosure may provide hierarchical levels of control for selecting or adjusting the transmission modes used for transmitting multiple traffic flows over the wireless medium in a manner that can increase network throughput and/or reduce network latencies (such as compared to conventional techniques based on a single control loop).

By selecting the transmission modes used for transmitting multiple traffic flows over a wireless medium based on network parameters of one or more wireless networks, one or more traffic flow attributes, or one or more SLA parameters of the traffic flows, an apparatus configured according to various aspects of the present disclosure may concurrently transmit multiple traffic flows over the wireless medium based on a selection of one of SU-MIMO communications, MU-MIMO communications, OFDMA communications, or partial BW MU-MIMO communications that that maximizes network throughput and minimizes network latencies. In addition, the ability to dynamically adjust the transmission mode used for transmitting a respective traffic flow over the wireless medium based on one or more of the network parameters, the traffic flow attributes, or the respective SLA parameters may allow the apparatus to maintain network throughput and latencies when one or more network conditions change. Also, by using a hierarchical control loop to not only obtain network parameters and traffic flow attributes of one or more wireless networks, but also to make transmission mode decisions based at least in part on network parameters and traffic flow attributes observed over relatively long periods of time (e.g., as compared to the relatively short periods of time associated with decision and response times of PHY devices), which may increase the accuracy with which the apparatus determines the most suitable transmission for a particular traffic flow.

Figure 7:
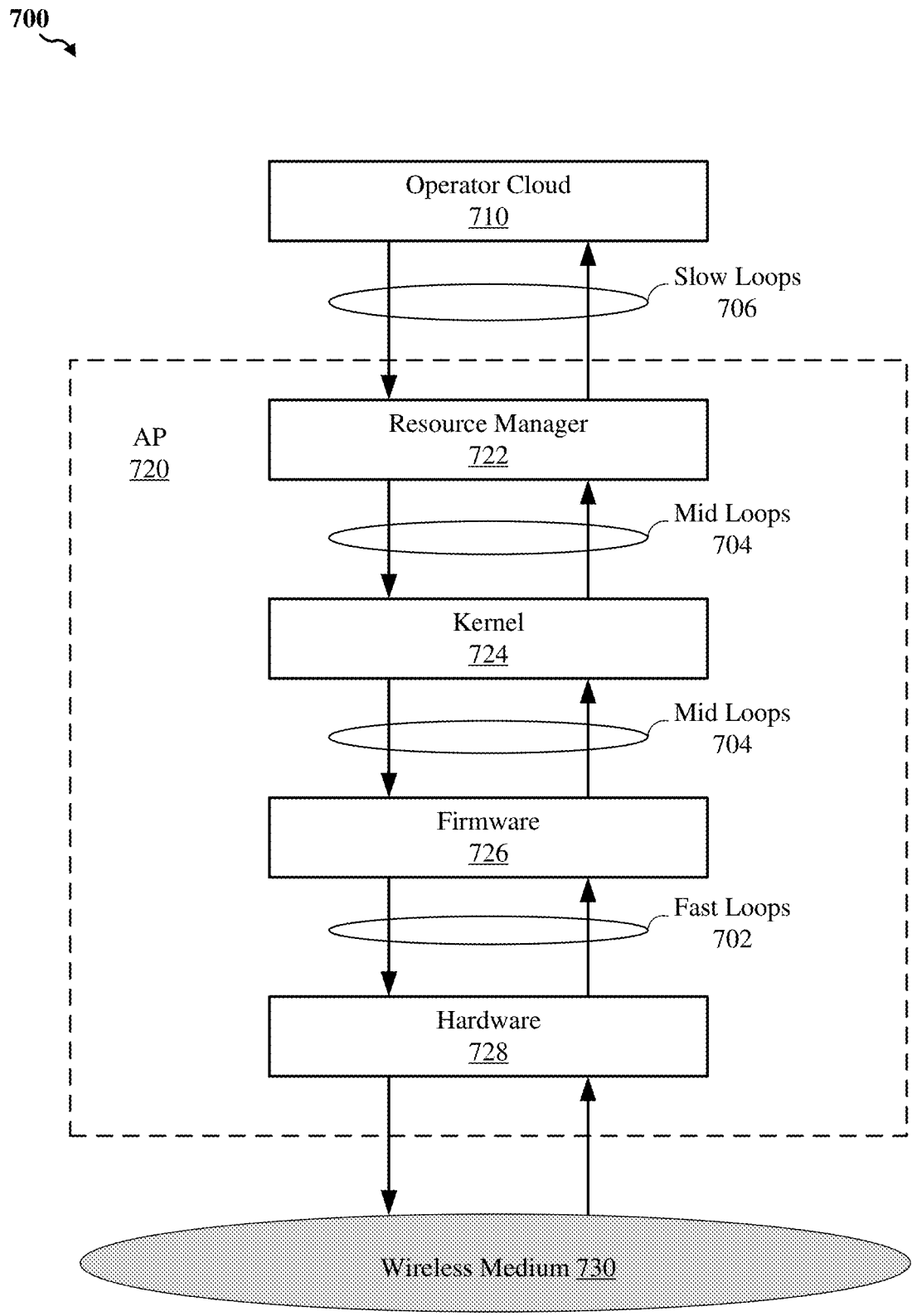
FIG. 7 shows a block diagram of another example wireless communication device.

FIG. 7 shows a system 700 of tiered control loops for wireless communication according to some implementations. The example system 700 includes an operator cloud 710 and an AP 720. In some implementations, the AP 720 may be one example of the AP 102 of FIG. 1, the wireless communication device 500 of FIG. 5, or the AP 602 of FIG. 6A. The operator cloud 710 may represent a backhaul network communicatively coupled to the AP 720 via an external network interface such as, for example, the external network interface 650 of FIG. 6A. Although not shown for simplicity, the operator cloud 710 may include a network controller or any combination of hardware or software configured to control or manage various operations of the AP 720.

The AP 720 is shown to include a resource manager 722, a kernel 724, a firmware component 726, and a hardware component 728. The firmware component 726 and hardware component 728 represent various components of a wireless communication device such as, for example, the wireless communication device 500 of FIG. 5. With reference to FIG. 5, the hardware component 728 may include one or more components of the modem 502 or the radio 504, and the firmware component 726 may include one or more components of the processor 506 or the memory 508. In some instances, the hardware component 728 may implement various PHY and MAC layer functionalities associated with transmitting packets over a wireless medium 730.

The resource manager 722 represents software executed by a host processor such as, for example, the application processor 630 of FIG. 6A. In some instances, the resource manager 722 may include instructions stored in memory 640 that can be executed by the application processor 630 to control various operations of the AP 720. For example, the resource manager 722 may use feedback information provided by the operator cloud 710 and SLAs associated with traffic flows communicated over the wireless medium 730 to select or adjust various settings, parameters, and configurations associated with the transmission of multiple traffic flows over the wireless medium 730 to different STAs (not shown for simplicity).

The kernel 724 may facilitate interactions between hardware and software components of the AP 720. For example, the kernel 724 may control various hardware resources of the AP 720 via device drivers, may arbitrate conflicts between hardware resources, and may optimize the utilization of shared resources (such as processor execution cycles, cache memory allocations, file systems, and network sockets). Although not shown in FIG. 7 for simplicity, the kernel 724 may include a host driver, one or more application programming interfaces (APIs), and a MAC Sublayer Management Entity (MLME). In some other aspects, one or more of the host driver, the APIs, or the MLME can be implemented in the resource manager 722.

In some implementations, the system 700 may provide hierarchical levels of control for various aspects of wireless communication by the AP 720. For example, the hardware component 728 may implement one or more "fast" control loops 702 based on feedback provided by the firmware component 726 and/or indications provided by the resource manager 722. The fast control loops 702 may control resource allocation decisions and transmission mode decisions that require fast convergence. Examples of fast control loops 702 may include just-in-time (JIT) scheduling, smart enhanced distributed channel access (EDCA) adjustments, lazy or aggressive rate control, MU-MIMO or OFDMA grouping, and pausing or unpausing of traffic identifiers (TIDs), among other examples. For example, when implementing a fast control loop 702 associated with MU-MIMO operation, the hardware component 728 may receive, from the resource manager 722, an indication that MU-MIMO communications are enabled for one or more traffic flows. The hardware component 728 may select MU-MIMO as the transmission mode for the one or more traffic flows based on the indication provided by the resource manager 722.

The resource manager 722 and kernel 724 may implement one or more "mid" control loops 704 that determine whether a respective traffic flow is suitable for transmission over the wireless medium 730 as an SU-MIMO communication, as an MU-MIMO communication, as an OFDMA communication, or as a partial BW MU-MIMO communication based on one or more of the network parameters, the traffic flow attributes, or the SLA parameters. In some instances, the mid control loops 704 may control various resource allocation decisions and transmission mode decisions with slower convergence requirements than those associated with the fast control loops 702. Examples of mid control loops 704 may include multi-link operation (MLO) link provisioning, activating or deactivating multi-link device (MLD) links, enabling or disabling MU communications, enabling or disabling fast rate control, configuring rate control loop constants, configuring maximum data rates, enabling or disabling energy-efficient operation, and configuring uplink (UL) or downlink (DL) throttling limits, among other examples. For example, when implementing a mid-control loop 704 associated with wireless communications, the resource manager 722 may indicate whether or not MU-MIMO communications are enabled for a traffic flow or a group of traffic flows. In this way, the mid control loops 704 may provide a dynamic range of execution for the fast control loops 702.

The operator cloud 710 may implement one or more "slow" control loops 706 to obtain network parameters, traffic flow attributes, and other network metrics associated with one or more wireless networks that are monitored by the operator cloud 710. In some instances, the slow control loops 706 may control various resource allocation decisions and transmission mode decisions with even slower convergence requirements than those associated with the mid control loops 704. Examples of slow control loops 706 may include setting thresholds for obtaining or otherwise determining one or more LSDs, setting link congestion thresholds and peer reliability thresholds for provisioned MLO, and configuring parameters for managed MU staging, among other examples. For example, when implementing a slow control loop 706 associated with wireless communications, the operator cloud 710 may provide network-level information of at least some of the monitored wireless networks as feedback to the resource manager 722. In this way, the slow control loops 706 may configure and/or manage one or more decision thresholds for the mid control loops 704.

In some implementations, the fast control loops 702 may be configured to make transmission mode decisions for some aspects of wireless communications that require responses between approximately 1 and 100 milliseconds, the mid control loops 704 may be configured to make transmission mode decisions for other aspects of wireless communications that require responses between approximately 1 and 5 seconds, and the slow control loops 706 may be configured to make transmission mode decisions for some other aspects of wireless communications that require responses between approximately 10 and 60 seconds.

In various implementations, the operator cloud 710 may monitor the interference levels, channel delay spread values (or other indicators of multipath), the number of active STAs, the number or percentage of active STAs that support MU-MIMO communications, the number or percentage of active STAs that support partial BW MU-MIMO communications, the number or percentage of the active STAs that support OFDMA communications, one or more service class parameters, and traffic loads associated with the wireless network operated by the AP 720, and may provide the resulting network parameters as feedback to the resource manager 722. The operator cloud 710 may also monitor data rates of the traffic flows, average burst sizes of the traffic flows, average burst periods of the traffic flows, interarrival times of packets associated with the traffic flows, and traffic patterns on the wireless network operated by the AP 720, and may provide the resulting traffic flow attributes as feedback to the resource manager 722. In some other implementations, the operator cloud 710 may monitor the network parameters and traffic flow attributes of one or more other wireless networks, and may provide the collective network parameters and traffic flow attributes as additional feedback to the resource manager 722.

In some implementations, the resource manager 722 may obtain one or more SLA parameters for each of the traffic flows based on service level agreements between the AP 720 and one or more entities associated with each of the traffic flows. In some aspects, the SLA parameters may specify a minimum data rate for one or more associated traffic flows, a delay bound for one or more associated traffic flows, a service interval for one or more associated traffic flows, a burst size for one or more associated traffic flows, a burst interval for one or more associated traffic flows, and throughput requirements for one or more associated traffic flows, among other examples.

The resource manager 722 may use one or more of the network parameters provided by the operator cloud 710, one or more of the traffic flow attributes provided by the operator cloud 710, and/or one or more SLA parameters for a respective traffic flow to determine whether the respective traffic flow is more likely to achieve higher throughput and lower latencies when transmitted as an SU-MIMO communication, as an MU-MIMO communication, as an OFDMA communication, or as a partial BW MU-MIMO communication. The resource manager 722 may also consider feedback information provided by the fast control loop 702 when determining which transmission mode is most suitable for transmitting the respective traffic flow over the wireless medium. In some instances, the resource manager 722 may also determine whether to enable or disable MU-MIMO communications for each traffic flow to be transmitted over the wireless medium 730 based on one or more of the network parameters, the traffic flow attributes, or the SLA parameters. In various aspects, the resource manager 722 may provide one or more transmission mode indications to the firmware component 726. For example, in some instances, the resource manager 722 may provide an indication of whether MU-MIMO communications are enabled or disabled for a traffic flow or a group of traffic flows. In other instances, the resource manager 722 may indicate which transmission mode is most likely to maximize throughput and/or to minimize latencies for a particular traffic flow or group of traffic flows.

As discussed, MU-MIMO communications may achieve higher throughputs and lower latencies than SU-MIMO communications by concurrently transmitting multiple traffic flows over the wireless medium 730 to different users. In some environments, MU-MIMO communications may achieve higher throughputs and lower latencies than OFDMA communications by using spatial diversity, rather than frequency or bandwidth allocations, to accommodate multiple users or traffic flows concurrently. Aspects of the present disclosure recognize that the throughput and latencies associated with MU-MIMO communications may depend on a variety of factors including (but not limited to) interference levels, channel delay spread values, the number of active STAs, the number or percentage of active STAs that support MU-MIMO communications, channel correlation between users grouped for MU communications, the amount of queued DL data available for transmission, specified data rates, specified burst periods, and specified burst sizes, among other examples.

Specifically, any one or more of relatively high levels of channel correlation between a group of users, relatively high levels of interference, or relatively high levels of channel delay spread may decrease the ability of receiving devices to distinguish between the packets of different traffic flows concurrently transmitted over the wireless medium using MU-MIMO communications, which in turn may decrease throughput and increase latencies associated with such MU-MIMO transmissions. As a result, MU-MIMO communications may not be suitable for transmitting multiple traffic flows over the wireless medium 730 when one or more of these conditions are present. Therefore, in some implementations, the resource manager 722 may disable MU-MIMO communications for transmitting multiple traffic flows over the wireless medium when one or more of the interference levels, channel correlations, or channel delay spread equals or exceeds their respective thresholds. For example, in some instances, the AP 720 may transmit traffic flows as MU-MIMO communications based at least in part on the interference levels being less than an interference threshold, the channel delay spread being less than a value, or both. In other instances, the AP 720 may transmit traffic flows as OFDMA communications based at least in part on the interference levels being at least equal to the interference threshold, the channel delay spread being at least equal to the value, or both.

In some implementations, the resource manager 722 may also consider the total number of active STAs in the wireless network and the number or percentage of the active STAs that support MU-MIMO communications when indicating a transmission mode for the traffic flow. For example, when the number or percentage of active STAs that support MU-MIMO communications is less than a minimum number, the AP 720 may not be able to group a sufficient number of traffic flows or users for MU communications to compensate for the relatively high overhead of MU-MIMO communications (such as compared to the overhead of SU-MIMO communications). For another example, although the benefits of MU-MIMO communications may depend on having more than a minimum number of traffic flows or users, the strength and quality of MU-MIMO communications may begin to decrease as the number of nearby active STAs or users increases beyond a certain number. As such, MU-MIMO communications may perform poorly in crowded environments having a dense concentration of wireless devices due to increases in interference, channel correlation, and channel delay spread resulting from the dense concentration of wireless devices, among other examples. Therefore, in some instances, the resource manager 722 may select MU-MIMO communications as the transmission mode for a traffic flow when the number or percentage of active STAs that support MU-MIMO communications equals or exceeds a first number and the total number of active STAs in the wireless network is less than a second number. Conversely, the resource manager 722 may select OFDMA communications as the transmission mode for the traffic flow when the number or percentage of active STAs that support MU-MIMO communications is less than the first number and the total number of active STAs in the wireless network equals or exceeds the second number.

Aspects of the present disclosure also recognize that MU-MIMO communications are well-suited for traffic flows that have relatively high data rates, which have a relatively low level of burstiness, and that can provide sufficient amounts of queued DL data in the AP 720 to compensate for the relatively high overhead of MU-MIMO communications. As such, in some implementations, the resource manager 722 may enable MU-MIMO communications for traffic flows having high data rates, having packet interarrival times offset in time from each other by less than a threshold time period, having average burst sizes at least equal to a burst size threshold, or any combination thereof. In some aspects, the decision to enable MU-MIMO communications for a respective traffic flow may also be based on the minimum data rate specified by the SLA being at least equal to a data rate threshold, the maximum delay bound specified by the SLA being at least equal to a delay period, the throughput requirement specified by the SLA being at least equal to a throughput threshold, or any combination thereof. In other implementations, the resource manager 722 may indicate that a traffic flow is suitable for transmission over the wireless medium 730 to one or more associated STAs as an MU-MIMO communication when the interarrival times of its respective packets are offset in time from each other by less than a threshold time period, when the average burst size equals or exceeds a burst size threshold, or both.

On the other hand, MU-MIMO communications may not be well-suited for transmitting a traffic flow having a relatively small burst size and a relatively long burst interval, for example, because the relatively high level of burstiness of the traffic flow may preclude, or at least decrease the likelihood of, grouping packets of the traffic flow with packets of one or more other traffic flows for MU transmissions. Therefore, in some implementations, the resource manager 722 may disable MU-MIMO communications for traffic flows having low data rates, having packet interarrival times offset in time from each other by more than the threshold time period, having average burst sizes less than the burst size threshold, or any combination thereof. In some instances, the resource manager 722 may select OFDMA or partial BW MU-MIMO as the transmission mode for transmitting such traffic flows over the wireless medium 720 to one or more associated STAs.

Also, MU-MIMO communications may not be well-suited for transmitting a traffic flow having strict latency requirements, for example, because the strict latency requirements may limit the time period by which the AP 720 can delay the transmission of queued packets of the traffic flow for possible grouping with other packets received by the AP 720 during the time period, which in turn decreases the likelihood of grouping the traffic flow with one or more other traffic flows for transmission over the wireless medium 730 as an MU-MIMO communication. As such, in some implementations, the resource manager 722 may disable MU-MIMO communications for traffic flows having a maximum latency tolerance less than a threshold latency. In some instances, the resource manager 722 may select OFDMA or partial BW MU-MIMO as the transmission mode for transmitting such traffic flows over the wireless medium 720 to one or more associated STAs.

In some implementations, the resource manager 722 may disable MU-MIMO communications for latency-sensitive traffic flows, for example, because latency-sensitive traffic flows typically have strict timing, throughput, and latency requirements that preclude, or at least decrease the likelihood of, grouping such traffic flows with each other and/or with other traffic flows for MU transmissions. In other implementations, the resource manager 722 may disable MU-MIMO communications only for latency-sensitive traffic flows having an amount of queued data that is less than the data threshold. Specifically, in some instances, the resource manager 722 may select MU-MIMO communications as the transmission mode for latency-sensitive traffic flows having an amount of queued data equal to or exceeding the data threshold, or may select OFDMA communications as the transmission mode for latency-sensitive traffic flows having an amount of queued data less than the data threshold. In some aspects, the resource manager 722 may select partial BW MU-MIMO communications as the transmission mode for latency-sensitive traffic flows when the number of active latency-sensitive traffic flows equals or exceeds a threshold number of traffic flows. On the other hand, the resource manager 722 may select OFDMA communications as the transmission mode for some latency-sensitive traffic flows when the number of active latency-sensitive traffic flows is less than the threshold number of traffic flows.

Figure 8:
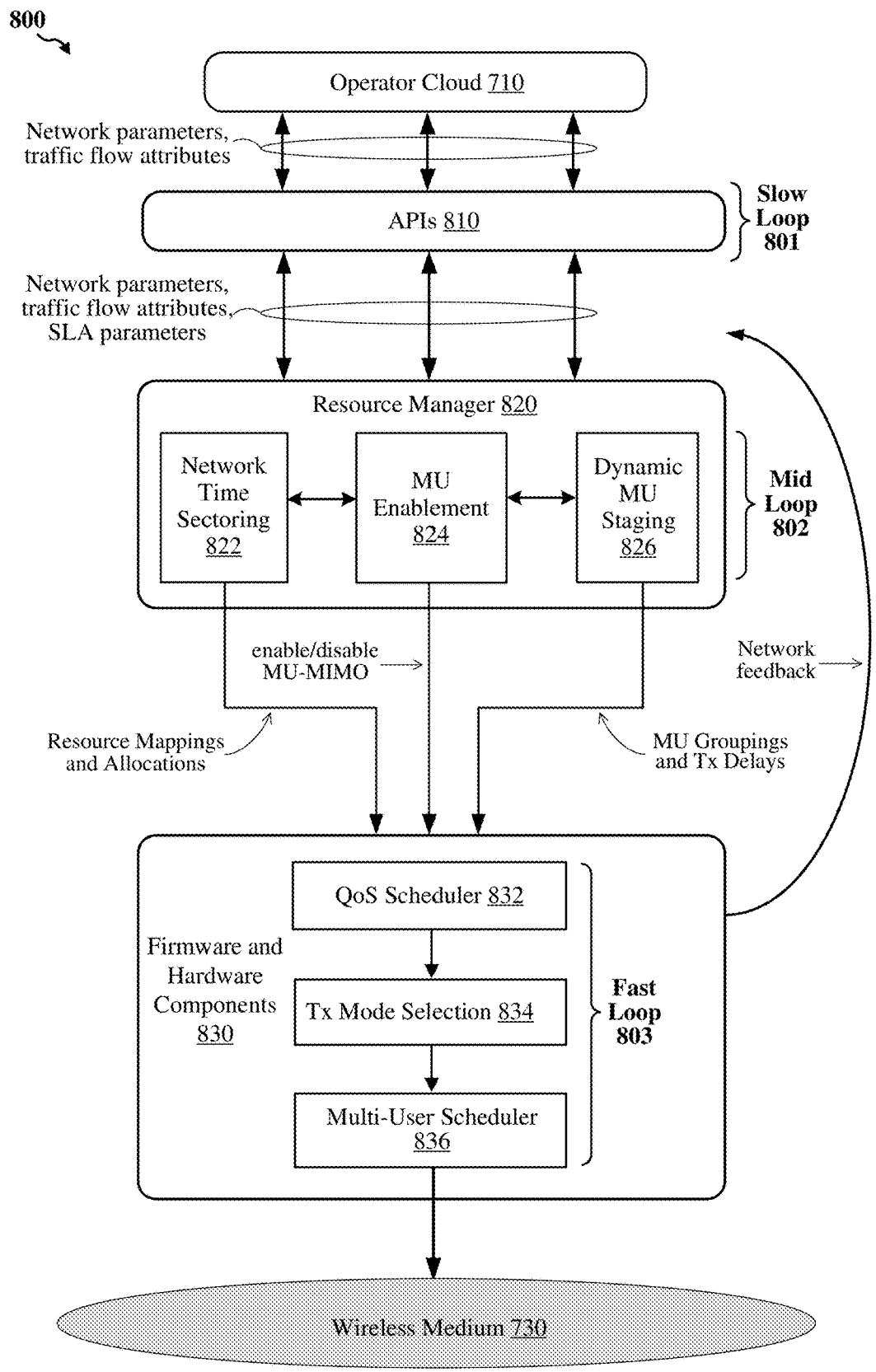
FIG. 8 shows a block diagram of an example resource manager suitable for use in wireless communication devices disclosed herein.

FIG. 8 shows a block diagram of an apparatus 800 associated with a slow control loop 801, a mid-control loop 802, and a fast control loop 803 of an AP, according to some implementations. In some implementations, the apparatus may be an AP such one of the APs 102, 602, and 720 of FIGS. 1, 6A, and 7, respectively. In various aspects, the slow control loop 801 may be associated with one or more application programming interfaces (APIs) 810 of the apparatus 800, and in some instances, may also be associated with the operator cloud 710 described with reference to FIG. 7. The mid control loop 802 may be associated with a resource manager 820 of the apparatus 800, and the fast control loop 803 may be associated with a firmware and hardware component 830 of the apparatus 800.

The APIs 810 may provide an interface through which the resource manager 820 can obtain network parameters and traffic flow attributes for one or more wireless networks monitored by the operator cloud 710. The APIs 810 may also provide an interface through which the resource manager 820 may obtain one or more SLA parameters for each of the traffic flows communicated over the wireless medium 730. In some aspects, the APIs 810 may be one example of the APIs described with reference to FIG. 6. For example, the APIs 810 may include an MLME API, a time sectoring API, an MU API, a resource manager telemetry API, a T2LM API, and one or more provisioning APIs, among other examples. In some instances, the one or more provisioning APIs may be used either independent of, or in conjunction with, the resource manager 820 to select or adjust the transmission modes used for transmitting traffic flows over the wireless medium 730. In other instances, the one or more provisioning APIs may be used either independent of, or in conjunction with, the resource manager 820 to provide indications of whether a respective traffic flow is more suitable for transmission over the wireless medium 730 as an SU-MIMO communication, as an MU-MIMO communication, as an OFDMA communication, or as a partial BW MU-MIMO communication.

In some implementations, the provisioning APIs may be instructed by the resource manager 820 to configure various aspects of the firmware and hardware component 830 based on the mid control loop 802. For example, the resource manager 820 may instruct the provisioning APIs to select or adjust the transmission mode used for transmitting traffic flows over the wireless medium 730, to select or adjust one or more of the thresholds used to determine whether a traffic flow is more suited for transmission over the wireless medium 730 as an SU-MIMO communication, as an MU-MIMO communication, as an OFDMA communication, or as a partial BW MU-MIMO communication, or to select or adjust the MCS used for transmitting traffic flows over the wireless medium 730. In some instances, the resource manager 820 may also instruct the provisioning APIs to assign a transmission mode to a particular packet queue, to select or adjust one or more data thresholds associated with the packet queues, or to select or adjust one or more delay periods associated with the packet queues or associated with traffic flows communicated over the wireless network.

The resource manager 820, which may be one example of the resource manager 722 of FIG. 7, is shown to include a network time sectoring component 822, an MU enablement component 824, and a dynamic MU staging component 826, among other components. The network time sectoring component 822 may divide a BSS (such as the BSS operated by the AP 720 of FIG. 7) into a number of time sectors, where each of the time sectors represents a respective interval of time that occurs periodically and does not overlap any of the other time sectors. In various aspects, the network time sectoring component 822 maps each of its associated STAs to one or more of the time sectors so that at least one STA is mapped to each time sector. For example, in some instances, the network time sectoring component 822 may map its associated STAs to the time sectors in order of association identifier (AID) values. In other instances, the network time sectoring component 822 may map its associated STAs to the time sectors based on one or more attributes or parameters of the BSS. Example attributes may include a volume of data traffic communicated with each STA, a direction of communications with each STA, capabilities supported by each STA, PHY modes supported by each STA, QoS requirements associated with each STA, network topology characteristics associated with each STA, channel characteristics associated with each STA, and SLA requirements associated with each STA, among other examples. In some aspects, network time sectoring component 822 may provision resources for communications with each of the associated STAs so that any communications with a given STA occur only during the time sector(s) to which the STA is mapped (and not during any time sectors to which the STA is not mapped). In various aspects, the network time sectoring component 822 provides an indication of the provisioned resources, including resource mapping and allocations, to the firmware and hardware component 830.

The MU enablement component 824 may implement any one or more of the operations performed by the resource manager 722 described with reference to FIG. 7. For example, the MU enablement component 824 may determine whether traffic flows associated with packets queued for transmission in the AP are suitable for transmission over the wireless medium 730 as SU-MIMO communications, as MU-MIMO communications, as OFDMA communications, or as partial BW MU-MIMO communications. In some instances, the MU enablement component 824 may use one or more of the network parameters, the traffic flow attributes, or the SLA parameters of a traffic flow to select one of SU-MIMO, MU-MIMO, OFDMA, or partial BW MU-MIMO as the transmission mode for the traffic flow. The MU enablement component 824 may also determine whether or not to enable MU-MIMO communications for a particular traffic flow or group of traffic flows based on one or more of the network parameters, the traffic flow attributes, or the SLA parameters. In some aspects, the MU enablement component 824 may indicate the respective transmission modes of traffic flows to the network time sectoring component 822, to the dynamic MU staging component 826, or both. In some implementations, the MU enablement component 824 may determine which traffic flows are candidates for MU grouping, and may provide an indication of the candidate traffic flows to the network time sectoring component 822, to the dynamic MU staging component 826, or both.

The dynamic MU staging component 826 may group packets associated with different traffic flows with one another for transmission over the wireless medium 730 as an MU-MIMO communication. Specifically, the dynamic MU staging component 826 may receive indications of which traffic flows are candidates for MU grouping from the MU enablement component 824, and may determine whether a sufficient number of queued packets associated with at least two of the candidate traffic flows can be grouped with one another and concurrently transmitted over the wireless medium 730 as an MU-MIMO communication. In some aspects, the grouped packets may be transmitted over the wireless medium 730 as one or more MU PPDUs formatted according to the IEEE 802.11 family of wireless communication standards. In some aspects, the dynamic MU staging component 826 may also determine the amount of available space in the packet queues associated with the AP. The dynamic MU staging component 826 may provide the MU groupings and indications of available space in the respective packet queues to the firmware and hardware component 830.

In various implementations, the dynamic MU staging component 826 may delay transmission of queued DL packets associated with a respective traffic flow for a delay period during which additional packets of the respective traffic flow and/or other packets associated with one or more other candidate traffic flows may be received and buffered in the packet queues. When these additional and/or other packets are received by the AP and available for transmission prior to expiration of the delay period, the dynamic MU staging component 826 may group the queued packets of the respective traffic flow with the additional packets of the respective traffic flow and/or the other packets associated with other traffic flows for transmission over the wireless medium 730 as an MU-MIMO communication. In some instances, the dynamic MU staging component 826 may group up to a number N of the traffic flows for transmission as an MU-MIMO communication, where the number N indicates the maximum number of users that can be grouped in a single MU PPDU. For example, the maximum number of users that can be grouped in an MU PPDU by an AP operating according to the 802.11ax and 802.11be amendments to the IEEE 802.11 standard is N=8.

In some implementations, the dynamic MU staging component 826 may determine whether or not to delay transmission of the queued packets for the delay period based at least in part on the amount of data carried in the queued packets being less than a queue data threshold associated with the respective traffic flow. The queue data threshold may correspond to a minimum amount or minimum transit duration of data carried by the queued packets to enable MU-MIMO communications for the respective traffic flow.

In some instances, the queue data threshold may also be based at least in part on the available space of the packet queues. For example, in some aspects, the dynamic MU staging component 826 may increase the queue data threshold when the available space in the corresponding packet queue is relatively high (such as greater than a value), or may decrease the queue data threshold when the available space in the corresponding packet queue is relatively low (such as less than the value). By increasing the queue data threshold for enabling MU-MIMO communications when the available space in the corresponding packet queue is relatively high, the dynamic MU staging component 826 may increase the efficiency with which different traffic flows may be grouped with one another for MU-MIMO communications. Conversely, by decreasing the queue data threshold for enabling MU-MIMO communications when available space in the corresponding packet queue is relatively low, the dynamic MU staging component 826 may increase the likelihood of grouping different traffic flows with one another for MU-MIMO communications.

In other instances, the queue data threshold may also be based at least in part on the BSS load of the AP. For example, in some aspects, the dynamic MU staging component 826 may increase the queue data threshold when the BSS load is relatively high (such as greater than a value), or may decrease the queue data threshold when the BSS load is relatively low (such as less than the value). By increasing the queue data threshold for enabling MU-MIMO communications when the BSS load is relatively high, the dynamic MU staging component 826 may increase the efficiency with which different traffic flows may be grouped with one another for MU-MIMO communications. Conversely, by decreasing the queue data threshold for enabling MU-MIMO communications when the BSS load is relatively low, the dynamic MU staging component 826 may increase the likelihood of grouping different traffic flows with one another for MU-MIMO communications.

The delay period may be any suitable time period that is less than the delay bound specified by the SLA parameters for a respective traffic flow. In this way, the AP may delay the transmission of one or more queued packets of a respective traffic flow for a possible MU grouping with additional packets of the respective traffic flow and/or with other packets associated with other traffic flows without violating the latency requirements associated with the respective traffic flow. In some aspects, the delay period may be set to zero, for example, to indicate that the queued packets are to be transmitted as an SU-MIMO communication when available for transmission (e.g., rather than delaying their transmission for possible MU groupings with yet-to-be received packets). The dynamic MU staging component 826 may provide the delay period associated with each traffic flow communicated over the wireless medium 730 to the firmware and hardware component 830.

In some implementations, the delay period may be based on one or more of the BSS load of the AP, the available space in the packet queues, or the minimum data rate of the respective traffic flow. For example, in some instances, the dynamic MU staging component 826 may increase the delay period when the minimum data rate specified by the SLA parameters for the respective traffic flow is relatively high (such as greater than a value), or may decrease the delay period when the minimum data rate specified by the SLA parameters for the respective traffic flow is relatively low (such as less than the value). In other instances, the dynamic MU staging component 826 may increase the delay period when the BSS load of the AP is relatively low (such as less than a value), or may decrease the delay period when the BSS load of the AP is relatively high (such as greater than the value). Specifically, by increasing the delay period when the BSS load is relatively low, the dynamic MU staging component 826 may increase the likelihood of grouping different traffic flows with one another for MU-MIMO communications. Conversely, by decreasing the delay period when the BSS load is relatively low, the dynamic MU staging component 826 may increase the efficiency with which different traffic flows may be grouped with one another for MU-MIMO communications.

In various implementations, the dynamic MU staging component 826 can obtain, from the firmware and hardware component 830 (or other components of the fast loop 803), feedback information indicating that at least a number or percentage of the MU-MIMO candidate traffic flows are not being grouped with one another for MU-MIMO transmissions prior to expiration of the respective delay periods of the MU-MIMO candidate traffic flows. In some aspects, the dynamic MU staging component 826 may adjust one or more of the respective delay period, the respective first threshold, or the respective second threshold associated with each of the traffic flow of the number or percentage of traffic flows based on the feedback information. In this way, the dynamic MU staging component 826 can determine the effectiveness of information provided by components of the mid loop 802 for grouping traffic flows together for MU-MIMO transmissions.

The firmware and hardware component 830, which may be an example of the firmware component 726 and the hardware component 728 described with reference to FIG. 7, is shown to include a QoS scheduler 832, a Tx Mode selection component 834, and an MU scheduler 836, among other components. The QoS scheduler 832 may obtain feedback information and indications from the resource manager 820 based on the mid control loop 802, and use the feedback information and indications to schedule the transmission of packets associated with different traffic flows in a manner that complies with various QoS parameters for each of the different traffic flows. In some instances, the QoS scheduler 832 may assign a transmission mode to the packet queues associated with each traffic flow based at least in part on the indications provided by the MU enablement component 834.

The Tx Mode selection component 834 may select or adjust the transmission mode for transmitting one or more traffic flows over the wireless medium 730 based on indications provided by the resource manager 820. In some instances, the Tx Mode selection component 834 may instruct or configure various MAC and PHY components of the AP to implement the transmission mode indicated by the resource manager 820. For example, when indications provided by the resource manager 722 select SU-MIMO as the transmission mode for a traffic flow, the Tx Mode selection component 834 may configure the MAC and PHY components of the AP, as well as any associated antenna resources (not shown for simplicity), for the transmission of one or more SU PPDUs over the wireless medium 730. Similarly, when indications provided by the resource manager 722 select OFDMA as the transmission mode for a traffic flow, the Tx Mode selection component 834 may configure the MAC and PHY components of the AP, as well as the associated antenna resources, for the transmission of one or more groups of MU PPDUs over the wireless medium 730.

For another example, when indications provided by the resource manager 722 select MU-MIMO as the transmission mode for a traffic flow, the Tx Mode selection component 834 may obtain MU grouping information and transmission delays (e.g., the delay times) associated with the traffic flow from the dynamic MU staging component 826, and configure the MAC and PHY components of the AP, as well as the associated antenna resources, for the transmission of one or more MU PPDUs over the wireless medium 730. Similarly, when indications provided by the resource manager 722 select partial BW MU-MIMO as the transmission mode for a traffic flow, the Tx Mode selection component 834 may obtain MU grouping information and transmission delays associated with the traffic flow from the dynamic MU staging component 826, and may obtain resource mappings and allocations from the network time sectoring component 822. The Tx Mode selection component 834 may configure the MAC and PHY components of the AP, as well as the associated antenna resources, for the transmission of one or more groups of MU PPDUs over one or more respective frequency allocations of the wireless medium 730.

The MU scheduler 836 may include, or may be associated with, a plurality of packet queues that can store and buffer incoming packets associated with multiple traffic flows for transmission over the wireless medium 730 to one or more STAs or groups of STAs. In various implementations, the MU scheduler 836 may delay the transmission of one or more groups of packets queued in the packet queues based on indications provided by the MU enablement logic 834 and the dynamic staging component 826.

FIG. 9A shows a timing diagram depicting an example communication 900, according to some implementations. The wireless communication 900 may be performed between an AP and two stations, STA1 and STA2. The AP may be any suitable access point, access terminal, base station, or apparatus that implements the corresponding AP. In some instances, the AP may be one example of the AP 102 of FIG. 1, the AP 602 of FIG. 6A, the AP 720 of FIG. 7, or the apparatus 800 of FIG. 8. Each of STA1-STA2 may be any suitable station, client device, user equipment (UE), or apparatus that implements the STA. In some instances, each of STA1-STA2 may be an example of the STAs 104 of FIG. 1 or the STA 604 of FIG. 6B. Although only two stations STA1-STA2 are shown in the example of FIG. 9A, in some other implementations, the BSS operated by the AP may include any suitable number of STAs.

In the example of FIG. 9A, the AP transmits groups of SU PPDUs 901, 902, and 903 over a wireless medium to STA1 between times $t_0$-$t_1$, between times $t_4$-$t_5$, and between times $t_6$-$t_7$, respectively. The AP also transmits groups of SU PPDUs 911 and 912 over the wireless medium to STA2 between times $t_2$-$t_3$ and between times $t_8$-$t_9$, respectively. In some instances, the groups of SU PPDUs 901, 902, and 903 may be associated with a first traffic flow intended for STA1, and the groups of SU PPDUs 911 and 912 may be associated with a second traffic flow intended for STA2.

Specifically, beginning at time $t_0$, PPDUs 901 of the first traffic flow are received and buffered in a first packet queue of the AP until the amount of data carried in the queued PPDUs 901 equals or exceeds a queue data threshold of the first traffic flow, at time $t_1$. In some instances, the queue data threshold of the first traffic flow may correspond to an amount of data that can be carried in the group of SU PPDUs 901. At time $t_1$, the AP transmits the queued PPDUs 901 over the wireless medium to STA1 as an SU-MIMO communication.

Beginning at time $t_2$, PPDUs 911 of the second traffic flow are received and buffered in a second packet queue of the AP until the amount of data carried in the queued PPDUs 911 equals or exceeds a queue data threshold of the second traffic flow, at time $t_3$. In some instances, the queue data threshold of the second traffic flow may correspond to an amount of data that can be carried in the group of SU PPDUs 911. At time $t_3$, the AP transmits the queued PPDUs 911 over the wireless medium to STA2 as an SU-MIMO communication.

Beginning at time $t_4$, additional PPDUs 902 of the first traffic flow are received and buffered in the first packet queue of the AP until the amount of data carried in the queued PPDUs 902 equals or exceeds the queue data threshold of the first traffic flow. At time $t_5$, the AP transmits the queued PPDUs 902 over the wireless medium to STA1 as an SU-MIMO communication.

Beginning at time $t_6$, additional PPDUs 903 of the first traffic flow are received and buffered in the first packet queue of the AP until the amount of data carried in the queued PPDUs 903 equals or exceeds the queue data threshold of the first traffic flow. At time $t_7$, the AP transmits the queued PPDUs 903 over the wireless medium to STA1 as an SU-MIMO communication.

Beginning at time $t_8$, additional PPDUs 912 of the second traffic flow are received and buffered in the second packet queue of the AP until the amount of data carried in the queued PPDUs 912 equals or exceeds the queue data threshold of the second traffic flow. At time $t_9$, the AP transmits the queued PPDUs 912 over the wireless medium to STA2 as an SU-MIMO communication.

As depicted in the example of FIG. 9A, each transmission of PPDUs to STA1 is an SU transmission that precludes other transmissions over the wireless medium, and each transmission of PPDUs to STA2 is an SU transmission that precludes other transmissions over the wireless medium. That is, while the SU PPDUs 901, 902, and 903 are transmitted over the wireless medium between respective times $t_0$-$t_1$, $t_4$-$t_5$, and times $t_6$-$t_7$, none of the other STAs (including STA2) may use the wireless medium. Similarly, while the SU PPDUs 911 and 912 are transmitted over the wireless medium between respective times $t_2$-$t_3$ and $t_8$-$t_9$, none of the other STAs (including STA1) may use the wireless medium. As such, transmitting multiple traffic flows over the wireless medium using SU-MIMO communications may not result in an efficient use of the wireless medium.

FIG. 9B shows a timing diagram depicting an example communication 950, according to other implementations. The example communication 950 may be performed between the AP and STA1-STA2 described with reference to FIG. 9A. In the example of FIG. 9B, the AP delays transmission of the PPDUs 901 of the first traffic flow by a delay period so that the PPDUs 901 can be grouped with the PPDUs 911 of the second traffic flow and concurrently transmitted over the wireless medium as one or more MU PPDUs 951 between times $t_2$-$t_3$. Similarly, the AP delays transmission of the PPDUs 902 and 903 of the first traffic flow by respective delay periods so that the PPDUs 902 and 903 can be grouped with the PPDUs 912 of the second traffic flow and concurrently transmitted over the wireless medium as one or more MU PPDUs 952 between times $t_8$-$t_9$.

Specifically, the AP begins receiving and buffering PPDUs 901 of the first traffic flow into a first packet queue at time $t_0$, and continues filling the first packet queue with the PPDUs 901 until time $t_1$, at which point the amount of data carried by the queued PPDUs 901 equals or exceeds a first queue data threshold. In some implementations, the first queue data threshold may correspond to a minimum amount or minimum transit duration of data carried by the queued PPDUs 901 to enable MU-MIMO communications for the first traffic flow. At time $t_1$, the AP designates the queued PPDUs 901 of the first traffic flow as a candidate for MU-MIMO communications, and delays transmission of the queued PPDUs 901 by a delay period 961. Thus, although the AP may transmit the queued PPDUs 901 as an SU-MIMO communication to STA1 at time $t_1$, the AP delays transmission of the queued PPDUs 901 for the delay period 961 during which the AP may receive additional packets of the first traffic flow and/or other packets associated with one or more other traffic flows. These additional and/or other packets, if received by the AP and available for transmission prior to expiration of the delay period 961, may be grouped with the queued PPDUs 901 of the first traffic flow and transmitted over the wireless medium as an MU-MIMO communication. In this way, aspects of the present disclosure may increase the likelihood of grouping packets associated with multiple traffic flows in a manner that allows the grouped packets of the multiple traffic flows to be concurrently transmitted over the wireless medium using MU-MIMO transmissions, which as discussed above may achieve higher throughputs and lower latencies than SU-MIMO transmissions.

The delay period 961 may be any suitable time period that is less than the delay bound specified by the SLA parameters for the first traffic flow. In this way, aspects of the present disclosure may delay transmission of the queued PPDUs 901 for a possible MU grouping with other packets received during the delay period 961 without violating the latency requirements associated with the first traffic flow. Although not shown in FIG. 9B for simplicity, in some aspects, the delay period 961 may be set to zero, for example, to indicate that the queued PPDUs 901 are to be transmitted as an SU-MIMO communication when available for transmission, rather than delaying transmission for a possible MU grouping.

During the delay period 961, at time $t_2$, the AP begins receiving and buffering PPDUs 911 of the second traffic flow into a second packet queue. By time $t_3$, the amount of data carried by the queued PPDUs 911 equals or exceeds a second queue data threshold. In some instances, the second queue data threshold may correspond to a minimum amount or minimum transit duration of data carried by the queued PPDUs 911 to enable MU-MIMO communications for the second traffic flow. In response thereto, the AP groups the queued PPDUs 901 of the first traffic flow with the queued PPDUs 911 of the second traffic flow for transmission over the wireless medium as an MU-MIMO communication. Specifically, at time $t_3$, the AP embeds the queued PPDUs 901 and PPDUs 911 into one or more MU PPDUs 951, and transmits the MU PPDUs 951 over the wireless medium to STA1 and STA2 as an MU-MIMO communication. In this way, the PPDUs 901 of the first traffic flow may be transmitted to STA1 concurrently with the transmission of PPDUs 911 of the second traffic flow to STA2.

In other implementations, the first queue data threshold may also be based on the available space in the first packet queue, and the second queue data threshold may also be based on the available space in the second packet queue. For example, in some instances, the resource manager of the AP may increase the first queue data threshold when the available space in the first packet queue is relatively high (such as greater than a first value), and may increase the second queue data threshold when the available space in the second packet queue is relatively high (such as greater than a second value). Conversely, the resource manager of the AP may decrease the first queue data threshold when the available space in the first packet queue is relatively low (such as greater than the first value), and may decrease the second queue data threshold when the available space in the second packet queue is relatively low (such as less than the second value). In this way, aspects of the present disclosure may use the mid-control loops disclosed herein to adjust the queue data thresholds of an AP's packet queues based on the available space in the respective packet queues.

In some other implementations, the first and second queue data thresholds may also be based on the BSS load of the AP. In some instances, when the BSS load is relatively high (such as greater than a value), the resource manager of the AP may increase the first and second queue data thresholds, for example, because there is more traffic on the wireless medium available for possible MU grouping with the queued PPDUs. In this way, the resource manager of the AP may increase the efficiency with which queued PPDUs associated with different traffic flows can be grouped together for concurrent transmission over the wireless medium as an MU-MIMO communication when the BSS load is relatively high. Conversely, when the BSS load is relatively low (such as less than the value), the resource manager of the AP may decrease the first and second queue data thresholds, for example, because there is less traffic on the wireless medium available for possible MU grouping with the queued PPDUs. In this way, the resource manager of the AP may increase the likelihood of grouping the queued PPDUs associated with different traffic flows for concurrent transmission over the wireless medium as an MU-MIMO communication when the BSS load is relatively low. In some aspects, aspects of the present disclosure may use the mid-control loops disclosed herein to adjust the queue data thresholds of an AP's packet queues based on the BSS load associated with the AP.

At time $t_4$, the AP begins receiving and buffering PPDUs 902 of the first traffic flow into the first packet queue, and continues filling the first packet queue with the PPDUs 902 until time $t_5$. Then, at time $t_5$, the AP delays transmission of the queued PPDUs 902 by a delay period 962 during which the AP may receive additional packets of the first traffic flow and/or other packets associated with one or more other traffic flows. These additional and/or other packets, if received by the AP and available for transmission prior to expiration of the delay period 962, may be grouped with the queued PPDUs 902 of the first traffic flow and transmitted over the wireless medium as an MU-MIMO communication. In some instances, the amount of data carried by the queued PPDUs 902 may equal or exceed the first queue data threshold at time $t_5$, and the AP may designate the queued PPDUs 902 as candidates for MU-MIMO communications. In other instances, the amount of data carried by the queued PPDUs 902 may be less than the first queue data threshold at time $t_5$, and the AP may not designate the queued PPDUs 902 as candidates for MU-MIMO communications. In some aspects, the AP may not designate the first traffic flow as eligible for MU-MIMO communications until enough additional PPDUs of the first traffic flow are received and buffered in the first packet queue such that the total amount of queued data associated with the first traffic flow equals or exceeds the first queue data threshold.

During the delay period 962, at time $t_6$, the AP begins receiving and buffering additional PPDUs 903 of the first traffic flow into the first packet queue. By time $t_7$, the amount of data carried by the queued PPDUs 902 and 903 of the first traffic flow equals or exceeds the first queue data threshold. At time $t_7$, the AP designates the queued PPDUs 902 and 903 of the first traffic flow as a candidate for MU-MIMO communications, and delays transmission of the queued PPDUs 902 and 903 for a remainder of the delay period 962. Thus, although the AP may transmit the queued PPDUs 902 and 903 as an SU-MIMO communication to STA1 at time $t_7$, the AP delays transmission of the queued PPDUs 902 and 903 for the remainder of the delay period 962 during which the AP may receive additional packets of the first traffic flow and/or other packets associated with one or more other traffic flows. These additional and/or other packets, if received by the AP and available for transmission prior to expiration of the delay period 962, may be grouped with the queued PPDUs 902 and 903 of the first traffic flow and transmitted over the wireless medium as an MU-MIMO communication. In this way, aspects of the present disclosure may increase the likelihood of grouping packets associated with multiple traffic flows in a manner that allows the grouped packets of the multiple traffic flows to be concurrently transmitted over the wireless medium using MU-MIMO transmissions, which as discussed above may achieve higher throughputs and lower latencies than SU-MIMO transmissions.

At time $t_8$, which occurs within the delay period 962, the AP begins receiving and buffering PPDUs 912 of the second traffic flow into the second packet queue. By time $t_9$, the amount of data carried by the queued PPDUs 912 of the second traffic flow equals or exceeds the second queue data threshold. As discussed, the second queue data threshold may correspond to a minimum amount or minimum transit duration of data carried by the queued PPDUs 912 to enable MU-MIMO communications for the second traffic flow. In response thereto, the AP groups the queued PPDUs 902 and 903 of the first traffic flow with the queued PPDUs 912 of the second traffic flow for transmission over the wireless medium as an MU-MIMO communication. Specifically, at time $t_9$, the AP embeds the queued PPDUs 902, 903, and 912 into one or more MU PPDUs 952, and transmits the MU PPDUs 952 over the wireless medium to STA1 and STA2 as an MU-MIMO communication. In this way, the PPDUs 902 and 903 of the first traffic flow may be transmitted to STA1 concurrently with the transmission of PPDUs 912 of the second traffic flow to STA2.

As discussed, the delay periods 961 and 962 may be any suitable time periods that are less than the delay bound specified by the SLA parameters for the first traffic flow, for example, so that the AP may delay the transmission of queued PPDUs of the first traffic flow for a possible MU grouping with other packets received during the respective delay periods 961 and 962 without violating the latency requirements associated with the first traffic flow.

In some implementations, the delay periods 961 and 962 may be adjusted based, at least in part, on the minimum data rate specified by the SLA parameters for the first traffic flow. For example, in some instances, the resource manager of AP may increase the delay periods 961 and 962 when the minimum data rate specified by the SLA parameters for the first traffic flow is relatively high (such as greater than a value). Conversely, the resource manager of the AP may decrease the delay periods 961 and 962 when the minimum data rate specified by the SLA parameters for the first traffic flow is relatively low (such as less than the value). In this way, aspects of the present disclosure may use the mid-control loops disclosed herein to adjust the delay period of a traffic flow based on the minimum data rate specified for the traffic flow.

In some other implementations, one or more of the first queue data threshold, the second queue data threshold, the delay period 961, or the delay period 926 may be adjusted by the slow control loops disclosed herein. Specifically, in some instances, the slow control loops disclosed herein may adjust one or more of the first queue data threshold, the second queue data threshold, the delay period 961, or the delay period 926 based at least in part on one or more of the number of traffic flows that are designated as candidates for MU grouping, an average data rate of the STAs for which the candidate traffic flows are intended, an average amount of data received by the STAs for which the candidate traffic flows are intended, channel conditions of the wireless medium, a level of contention on the wireless medium, a level of interference on the wireless medium, or a channel occupancy of the wireless medium. For example, in some aspects, the resource manager of the AP may increase the delay periods 961 and 962 based on indications from the operator cloud 710 that the average data rate of the STAs receiving the respective traffic flow is relatively high (such as greater than a value), or may decrease the delay periods 961 and 962 based on indications from the operator cloud 710 that the average data rate of the STAs receiving the respective traffic flow is relatively low (such as less than the value). For another example, in some aspects, the resource manager of the AP may increase the delay periods 961 and 962 based on indications from the operator cloud 710 that the number of traffic flows designated as MU grouping candidates is relatively low (such as less than a value), or may decrease the delay periods 961 and 962 based on indications from the operator cloud 710 that the number of traffic flows designated as MU grouping candidates is relatively high (such as greater than the value). For another example, in other aspects, the resource manager of the AP may increase the delay periods 961 and 962 based on indications from the operator cloud 710 that one or more of the channel conditions, contention levels, interference levels, or channel occupancy of the wireless medium is relatively high (such as greater less than a level), or may decrease the delay periods 961 and 962 based on indications from the operator cloud 710 that one or more of the channel conditions, contention levels, interference levels, or channel occupancy of the wireless medium is relatively low (such as less than the level).

In various implementations, the resource manager of the AP may obtain feedback information from the fast control loops disclosed herein indicating that at least a number or percentage of the traffic flows communicated over the wireless medium are not being grouped with one another for MU-MIMO transmissions prior to expiration of the delay periods 961 and 962. In some aspects, the resource manager may adjust one or more of the first queue data threshold, the second queue data threshold, the delay period 961, or the delay period 962 based on the feedback information. For example, in some instances, the resource manager may decrease the first and second queue data thresholds when the number or percentage of traffic flows not being grouped with one another for MU-MIMO transmissions prior to expiration of the delay periods is relatively high (such as greater than a first number). In some aspects, the resource manager may also increase the delay periods 961 and 962 when the number or percentage of traffic flows not being grouped with one another for MU-MIMO transmissions prior to expiration of the delay periods is relatively high.

Conversely, the resource manager may increase the first and second queue data thresholds when the number or percentage of traffic flows not being grouped with one another for MU-MIMO transmissions prior to expiration of the delay periods is relatively low (such as less than a second number that is lower than the first number). In some aspects, the resource manager may also decrease the delay periods 961 and 962 when the number or percentage of traffic flows not being grouped with one another for MU-MIMO transmissions prior to expiration of the delay periods is relatively low. In this way, aspects of the present disclosure may increase the likelihood of grouping different traffic flows with one another for MU-MIMO communications when the number or percentage of traffic flows not being grouped with one another for MU-MIMO transmissions prior to expiration of the delay periods is relatively high, or may increase the efficiency with which different traffic flows may be grouped with one another for MU-MIMO communications when the number or percentage of traffic flows not being grouped with one another for MU-MIMO transmissions prior to expiration of the delay periods is relatively low.

As discussed, the resource manager of the AP may adjust one or more of the first queue data threshold, the second queue data threshold, the delay period 961, or the delay period 962 based on network telemetry and other feedback information provided by the slow control loops disclosed herein. In this way, aspects of the present disclosure may use various network parameters, traffic flow attributes, and traffic patterns observed over relatively long periods of time associated with the slow control loops to fine tune one or more corresponding coarse adjustments to the queue data thresholds or delay periods facilitated by the mid-control loops and/or fast control loops disclosed herein. These fine tune adjustments to the queue data thresholds or delay periods may increase the efficiency with which APs can identify and group multiple traffic flows with one another for transmission over the wireless medium as MU-MIMO communications.

Figure 10:
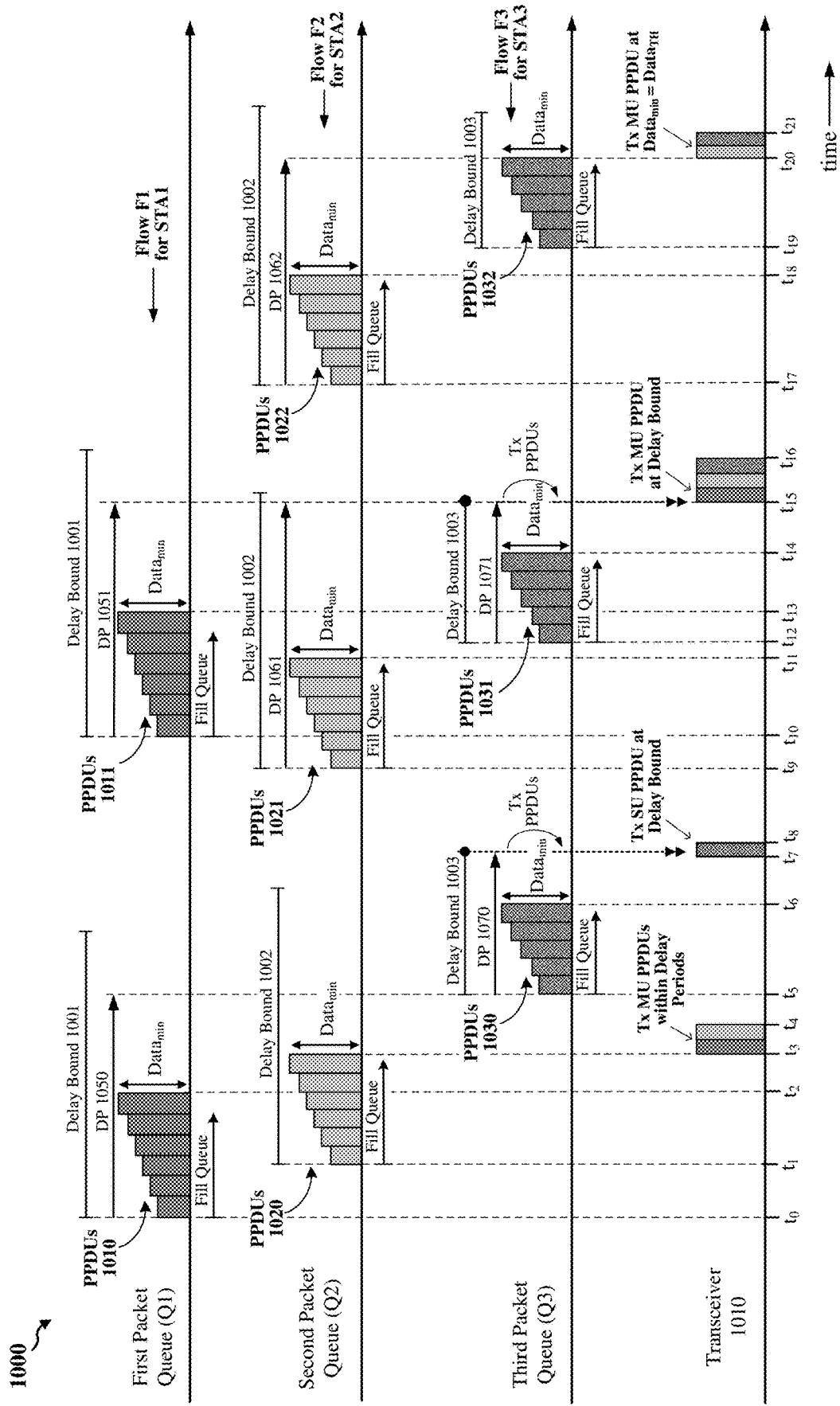
FIG. 10 shows a timing diagram depicting an example wireless communication that supports grouping traffic flows for MU-MIMO communications, according to some implementations.

FIG. 10 shows a timing diagram depicting an example wireless communication 1000 that supports grouping multiple traffic flows together for MU-MIMO communications, according to some implementations. The wireless communication 1000 may be performed between an AP and three stations STA1-STA3. The AP may be any suitable access point, access terminal, base station, or an apparatus that implements the AP. In some instances, the AP may be one example of the AP 102 of FIG. 1, the AP 602 of FIG. 6A, the AP 720 of FIG. 7, or the apparatus of FIG. 8. Each of STA 1-STA3 may be any suitable wireless station, client device, user equipment (UE), or an apparatus that implements the STA. In some instances, each of the STA1-STA3 may be an example of the STAs 104 of FIG. 1 or the STA 604 of FIG. 6B.

The example of FIG. 10 shows a first packet queue Q1, a second packet queue Q2, a third packet queue Q3, and a transmitter 1010 of the AP. In various implementations, the packet queues Q1-Q3 may be implemented in the hardware component 728 of the AP 720 of FIG. 7 or the hardware component 830 of the apparatus 800 of FIG. 8. In some other instances, the packet queues Q1-Q3 may be implemented in the MAC layer and/or the PHY of the AP. In the example of FIG. 10, the first packet queue Q1 may be associated with a first traffic flow (F1) intended for STA1, the second packet queue Q2 may be associated with a second traffic flow (F2) intended for STA2, and the third packet queue Q3 may be associated with a third traffic flow (F3) intended for STA3. The traffic flows F1-F3 may be received by the AP from one or more other devices, for example, over a backhaul connection.

The AP may obtain SLA parameters for each of the traffic flows F1-F3, network parameters associated with one or more wireless networks (including the BSS operated or managed by the AP), indications of the available space in each of the packet queues Q1-Q3, or any combination thereof. In some implementations, the SLA parameters obtained by the AP indicate at least a delay bound for each of the traffic flows F1-F3. For example, the first traffic flow F1 has a specified delay bound 1001, the second traffic flow F2 has a specified delay bound 1002, and the third traffic flow F3 has a specified delay bound 1003. The delay bounds 1001, 1002, and 1003 may indicate the maximum amount by which respective traffic flows F1-F3 can be delayed for transmission without violating the latency requirements specified by the SLA parameters. In some instances, the AP may also obtain one or more of the network parameters, the traffic flow attributes, or the SLA parameters for any number of the traffic flows F1-F3.

At time $t_0$, the AP begins receiving and buffering a number of PPDUs 1010 associated with flow F1 into the first packet queue Q1, and continues filling the first packet queue Q1 with the PPDUs 1010 until time $t_2$, at which point the amount of data carried by the queued PPDUs 1010 equals or exceeds a first queue data threshold associated with flow F1. The first queue data threshold may correspond to the minimum amount of data ($Data_{min}$) carried by the queued PPDUs 1010 to enable MU-MIMO communications for flow F1. In response thereto, the AP designates the queued PPDUs 1010 of flow F1 as a candidate for MU-MIMO communications, and delays transmission of the queued PPDUs 1010 by a delay period 1050 that may last until time $t_5$. During the delay period 1050, the AP may receive additional packets of flow F1 and/or other packets associated with other traffic flows.

While the AP continues receiving the PPDUs 1010 of flow F1, the AP begins receiving and buffering a number of PPDUs 1020 associated with flow F2 into the second packet queue Q2, at time $t_1$. The AP continues filling the second packet queue Q2 with received PPDUs 1020 until the amount of data carried by the queued PPDUs 1020 equals or exceeds a second queue data threshold associated with flow F2, at time $t_3$. The second queue data threshold may correspond to the minimum amount of data ($Data_{min}$) carried by the queued PPDUs 1020 to enable MU-MIMO communications for flow F2. In response thereto, the AP designates the queued PPDUs 1020 of flow F2 as a candidate for MU-MIMO communications, and at time $t_3$ groups the queued PPDUs 1010 of flow F1 with the queued PPDUs 1020 of flow F2 for transmission as an MU-MIMO communication. Specifically, the AP embeds the PPDUs 1010 and 1020 of the first and second traffic flows, respectively, into one or more MU PPDUs, and transmits the one or more MU PPDUs over the wireless medium to STA1 and STA2 as an MU-MIMO communication between times $t_3$-$t_4$.

At time $t_5$, the AP begins receiving and buffering a number of PPDUs 1030 associated with flow F3 into the third packet queue Q3, and continues filling the third packet queue Q3 with the PPDUs 1030 until time $t_6$, at which point the amount of data carried by the queued PPDUs 1030 equals or exceeds a third queue data threshold associated with flow F3. The third queue data threshold may correspond to the minimum amount of data ($Data_{min}$) carried by the queued PPDUs 1030 to enable MU-MIMO communications for flow F3. In response thereto, the AP designates the queued PPDUs 1030 of flow F3 as a candidate for MU-MIMO communications, and delays transmission of the queued PPDUs 1030 by a delay period 1070 that may last until time $t_7$. During the delay period 1070, the AP may receive additional packets of flow F3 and/or other packets associated with other traffic flows. In the example of FIG. 10, the AP does not receive additional packets prior to expiration of the delay period 1070 at time $t_7$, and transmits the queued PPDUs 1030 as an SU-MIMO communication over the wireless medium to STA3 between times $t_7$-$t_8$.

At time $t_9$, the AP begins receiving and buffering a number of PPDUs 1021 associated with flow F2 into the second packet queue Q2, and continues filling the second packet queue Q2 with the PPDUs 1021 until time $t_{11}$, at which point the amount of data carried by the queued PPDUs 1021 equals or exceeds the second queue data threshold. In response thereto, the AP designates the queued PPDUs 1021 of flow F2 as a candidate for MU-MIMO communications, and delays transmission of the queued PPDUs 1021 by a delay period 1061 that may last until time $t_{15}$. During the delay period 1061, the AP may receive additional packets of flow F2 and/or other packets associated with other traffic flows.

While the AP continues receiving the PPDUs 1021 of flow F2, the AP begins receiving and buffering a number of PPDUs 1011 associated with flow F1 into the first packet queue Q1, at time $t_{10}$. The AP continues filling the first packet queue Q1 with received PPDUs 1011 until the amount of data carried by the queued PPDUs 1011 equals or exceeds the first queue data threshold, at time $t_{13}$. In response thereto, the AP designates the queued PPDUs 1011 of flow F1 as a candidate for MU-MIMO communications, and delays transmission of the queued PPDUs 1011 by a delay period 1051 that may last until time $t_{15}$. During the delay period 1051, the AP may receive additional packets of flow F1 and/or other packets associated with other traffic flows.

While the AP receives the PPDUs 1011 of flow F1 into the first packet queue Q1, the AP begins receiving and buffering a number of PPDUs 1031 associated with flow F3 into the third packet queue Q3, at time $t_{12}$. The AP continues filling the third packet queue Q3 with received PPDUs 1031 until the amount of data carried by the queued PPDUs 1031 equals or exceeds the third queue data threshold, at time $t_{14}$. In response thereto, the AP designates the queued PPDUs 1031 of flow F3 as a candidate for MU-MIMO communications, and delays transmission of the queued PPDUs 1031 by a delay period 1071 that may last until time $t_{15}$. During the delay period 1071, the AP may receive additional packets of flow F3 and/or other packets associated with other traffic flows.

At time $t_{15}$, the delay period 1071 expires at the maximum delay bound 1003 specified by the SLA parameters for flow F3. The AP groups the queued PPDUs 1011 of flow F1, the queued PPDUs 1021 of flow F2, and the queued PPDUs 1031 of flow F3 for MU-MIMO communications. Specifically, the AP embeds the PPDUs 1011, the PPDUs 1021, and the PPDUs 1031 of flows F1, F2, and F3, respectively, into one or more MU PPDUs, and transmits the one or more MU PPDUs over the wireless medium to STA1-STA3 as an MU-MIMO communication between times $t_{15}$-$t_{16}$.

At time $t_{17}$, the AP begins receiving and buffering a number of PPDUs 1022 associated with flow F2 into the second packet queue Q2, and continues filling the second packet queue Q2 with the PPDUs 1022 until time $t_{18}$, at which point the amount of data carried by the queued PPDUs 1022 equals or exceeds the second queue data threshold. In response thereto, the AP designates the queued PPDUs 1022 of flow F2 as a candidate for MU-MIMO communications, and delays transmission of the queued PPDUs 1022 by a delay period 1062 that may last until time $t_{20}$ or later. During the delay period 1062, the AP may receive additional packets of flow F2 and/or other packets associated with other traffic flows.

After the AP stops receiving and buffering the PPDUs 1022 into the second packet queue Q2, the AP begins receiving and buffering a number of PPDUs 1032 associated with flow F3 into the third packet queue Q3 at time $t_{19}$. The AP continues filling the third packet queue Q3 with received PPDUs 1032 of flow F2 during the delay period 1062 until the amount of data carried by the queued PPDUs 1032 equals or exceeds the third queue data threshold, at time $t_{20}$. In response thereto, the AP designates the queued PPDUs 1032 of flow F3 as a candidate for MU-MIMO communications, and groups the queued PPDUs 1022 of flow F2 with the queued PPDUs 1032 of flow F3 for MU-MIMO communications. Specifically, the AP embeds the PPDUs 1022 and the PPDUs 1032 into one or more MU PPDUs, and transmits the one or more MU PPDUs over the wireless medium to STA2 and STA3 as an MU-MIMO communication between times $t_{20}$-$t_{21}$.

Figure 11:
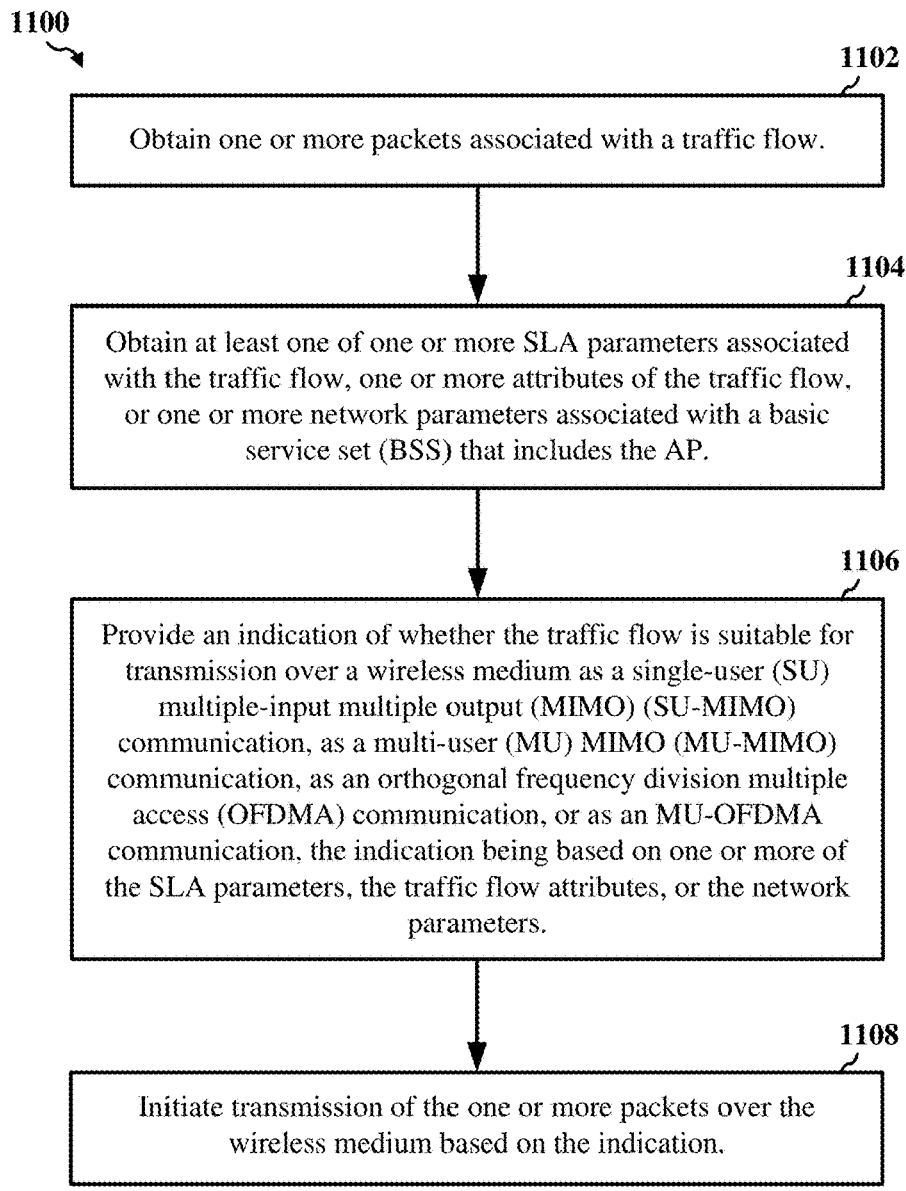
FIG. 11 shows a flowchart illustrating another example operation for wireless communication that supports selectively enabling MU-MIMO communications, according to some implementations.

FIG. 11 shows a flowchart illustrating an example operation 1100 for wireless communication that supports selectively enabling MU-MIMO communications, according to some implementations. The operation 1100 may be performed by an apparatus such as the wireless communication device 500 described above with reference to FIG. 5. In some instances, the operation 1100 may be performed by a wireless device operating as or within an AP, such as one of the APs 102, 602, or 720 described above with reference to FIGS. 1, 6A, and 7, respectively.

For example, at 1102, the apparatus obtains one or more packets associated with a traffic flow. At 1104, the apparatus obtains at least one of one or more SLA parameters associated with the traffic flow, one or more attributes of the traffic flow, or one or more network parameters associated with a basic service set (BSS) that includes the apparatus. At 1106, the apparatus provides an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) SU-MIMO communication, the indication being based on one or more of the SLA parameters, the traffic flow attributes, or the network parameters. At 1108, the apparatus initiates transmission of the one or more packets over the wireless medium based on the indication.

In various implementations, the apparatus may include a resource manager configured to obtain the SLA parameters, the traffic flow attributes, and the network parameters based on the slow control loop 702 described with reference to FIG. 7. In some instances, the resource manager may determine whether the traffic flow is suitable for transmission over the wireless medium via SU-MIMO, MU-MIMO, OFDMA, or partial BW MU-MIMO using one or more of the SLA parameters, the traffic flow attributes, or the network parameters based on the mid control loop 704 described with reference to FIG. 7. The WLAN subsystem may be configured to transmit traffic flows over the wireless medium based on the transmission modes indicated by the resource manager. In some aspects, the WLAN subsystem may be based on the fast control loop 706 described with reference to FIG. 7. In some implementations, the fast control loop 702 may be between approximately 1 and 100 milliseconds, the mid control loop 704 may be between approximately 1 and 5 seconds, and the slow control loop 706 may be between approximately 10 and 60 seconds.

In some implementations, the apparatus may be configured as an access point (AP) associated with the BSS. In some instances, the apparatus may include a transceiver configured to transmit the one or more packets over the wireless medium to one or more STAs associated with the AP. The SLA parameters may include (but are not limited to) one or more of a minimum data rate, a maximum delay bound, a service interval, a burst size, or a throughput requirement for traffic flows associated with the SLA. The network parameters may include (but are not limited to) one or more of interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium. The traffic flow attributes may include (but are not limited to) at least a data rate of the traffic flow, an average burst size of the traffic flow, and interarrival times of the one or more packets associated with the traffic flow.

Figure 12:
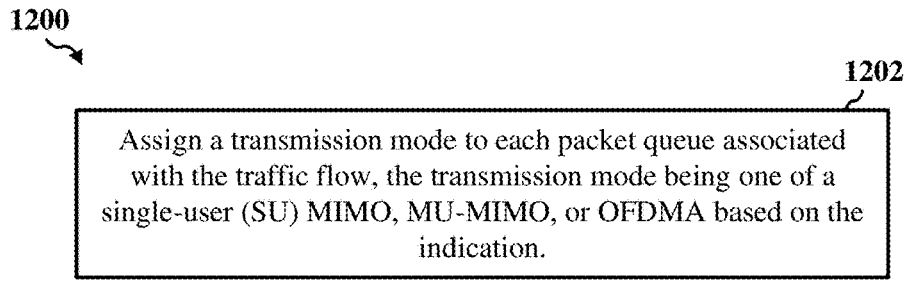
FIG. 12 shows a flowchart illustrating an example operation for wireless communication that supports selectively enabling MU-MIMO communications, according to some implementations.

FIG. 12 shows a flowchart illustrating another example 1200 operation for wireless communication that supports selectively enabling MU-MIMO communications, according to some implementations. The operation 1200 may be performed by an apparatus such as the wireless communication device 500 described above with reference to FIG. 5. In some implementations, the operation 1200 may be performed by a wireless device operating as or within an AP, such as one of the APs 102, 602, or 720 described above with reference to FIGS. 1, 6A, and 7, respectively. In some instances, the operation 1200 may be performed after obtaining the parameters at 1104 of FIG. 11. For example, at 1202, the apparatus assigns a transmission mode to each packet queue associated with the traffic flow, the transmission mode being one of SU-MIMO, MU-MIMO, OFDMA, or partial BW MU-MIMO based on the indication. In some implementations, the resource manager of the apparatus may indicate the assigned transmission modes to firmware and/or hardware components of the apparatus.

Figure 13A:
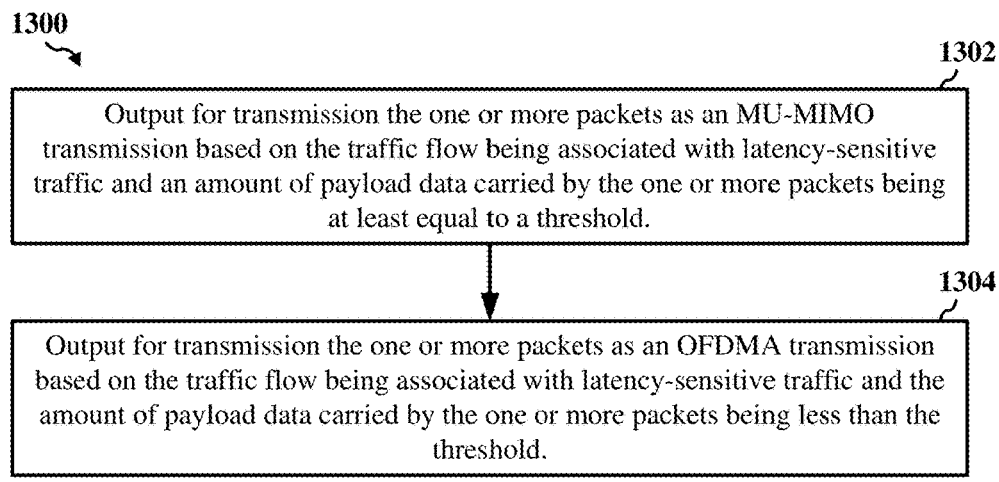

FIG. 13A shows a flowchart illustrating another example operation 1300 for wireless communication that supports selectively enabling MU-MIMO communications, according to some implementations. The operation 1300 may be performed by an apparatus such as the wireless communication device 500 described above with reference to FIG. 5. In some implementations, the operation 1300 may be performed by a wireless device operating as or within an AP, such as one of the APs 102, 602, or 720 described above with reference to FIGS. 1, 6A, and 7, respectively. In some implementations, the operation 1300 may be performed after obtaining the parameters at 1104 of FIG. 11. In some instances, the apparatus outputs for transmission the one or more packets as an MU-MIMO transmission based on the traffic flow being associated with latency-sensitive traffic and an amount of payload data carried by the one or more packets being at least equal to a threshold, at 1302. In other instances, the apparatus outputs for transmission the one or more packets as an OFDMA transmission based on the traffic flow being associated with latency-sensitive traffic and the amount of payload data carried by the one or more packets being less than the threshold, at 1304.

Figure 13B:
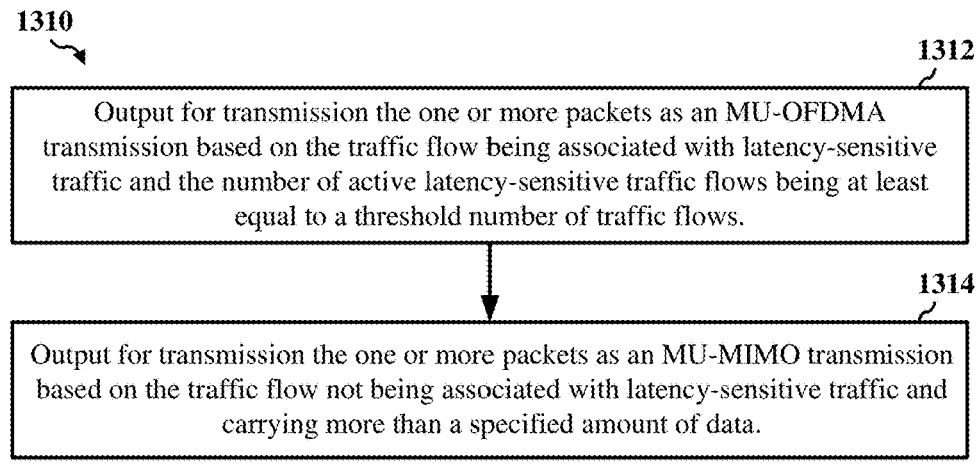

FIG. 13B shows a flowchart illustrating another example operation 1310 for wireless communication that supports selectively enabling MU-MIMO communications, according to some implementations. The operation 1310 may be performed by an apparatus such as the wireless communication device 500 described above with reference to FIG. 5. In some implementations, the operation 1310 may be performed by a wireless device operating as or within an AP, such as one of the APs 102, 602, or 720 described above with reference to FIGS. 1, 6A, and 7, respectively. In some implementations, the operation 1310 may be performed after obtaining the parameters at 1104 of FIG. 11. In some instances, the apparatus outputs for transmission the one or more packets as a partial BW MU-MIMO transmission based on the traffic flow being associated with latency-sensitive traffic and the number of active latency-sensitive traffic flows being at least equal to a threshold number of traffic flows, at 1312. In other instances, the apparatus outputs for transmission the one or more packets as an MU-MIMO transmission based on the traffic flow not being associated with latency-sensitive traffic and carrying more than a specified amount of data, at 1314.

Figure 13C:
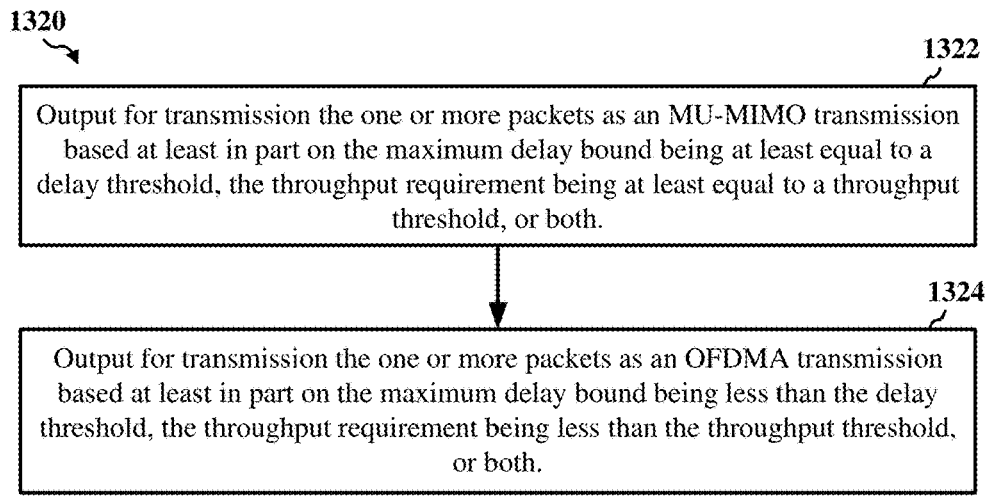

FIG. 13C shows a flowchart illustrating another example operation 1320 for wireless communication that supports selectively enabling MU-MIMO communications, according to some implementations. The operation 1320 may be performed by an apparatus such as the wireless communication device 500 described above with reference to FIG. 5. In some implementations, the operation 1320 may be performed by a wireless device operating as or within an AP, such as one of the APs 102, 602, or 720 described above with reference to FIGS. 1, 6A, and 7, respectively. In some implementations, the operation 1320 may be performed after obtaining the parameters at 1104 of FIG. 11. In some instances, the apparatus outputs for transmission the one or more packets as an MU-MIMO transmission based at least in part on the maximum delay bound being at least equal to a delay threshold, the throughput requirement being at least equal to a throughput threshold, or both, at 1322. In other instances, the apparatus outputs for transmission the one or more packets as an OFDMA transmission based at least in part on the maximum delay bound being less than the delay threshold, the throughput requirement being less than the throughput threshold, or both, at 1324.

FIG. 13D shows a flowchart illustrating another example operation 1330 for wireless communication that supports selectively enabling MU-MIMO communications, according to some implementations. The operation 1330 may be performed by an apparatus such as the wireless communication device 500 described above with reference to FIG. 5. In some implementations, the operation 1330 may be performed by a wireless device operating as or within an AP, such as one of the APs 102, 602, or 720 described above with reference to FIGS. 1, 6A, and 7, respectively. In some implementations, the operation 1330 may be performed after obtaining the parameters at 1104 of FIG. 11. In some instances, the apparatus outputs for transmission the one or more packets as an MU-MIMO transmission based at least in part on the interference levels being less than an interference threshold, the channel delay spread being less than a threshold amount, or both, at 1332. In other instances, the apparatus outputs for transmission the one or more packets as an OFDMA transmission based at least in part on the interference levels being at least equal to the interference threshold, the channel delay spread being at least equal to the threshold amount, or both, at 1334. In some aspects, the output for transmission as the MU-MIMO transmission may also be based on the number or percentage of active STAs that support MU-MIMO communications being at least equal to a first amount and the number of associated STAs being less than a second amount. In other aspects, the output for transmission as the SU-MIMO or OFDMA transmission may also be based on the number or percentage of active STAs that support MU-MIMO communications being less than the first amount and the number of associated STAs being at least equal to the second amount.

FIG. 13E shows a flowchart illustrating another example operation 1340 for wireless communication that supports selectively enabling MU-MIMO communications, according to some implementations. The operation 1340 may be performed by an apparatus such as the wireless communication device 500 described above with reference to FIG. 5. In some implementations, the operation 1340 may be performed by a wireless device operating as or within an AP, such as one of the APs 102, 602, or 720 described above with reference to FIGS. 1, 6A, and 7, respectively. In some implementations, the operation 1340 may be performed after obtaining the parameters at 1104 of FIG. 11. In some instances, the apparatus outputs for transmission the one or more packets as an MU-MIMO transmission based on the respective interarrival times being offset in time from each other by less than a threshold time period and the average burst size being at least equal to a burst size threshold, at 1342. In other instances, the apparatus outputs for transmission the one or more packets as an SU-MIMO or OFDMA transmission based on the respective interarrival times being offset in time from each other by more than the threshold time period and the average burst size being less than the burst size threshold, at 1344.

Figure 14:
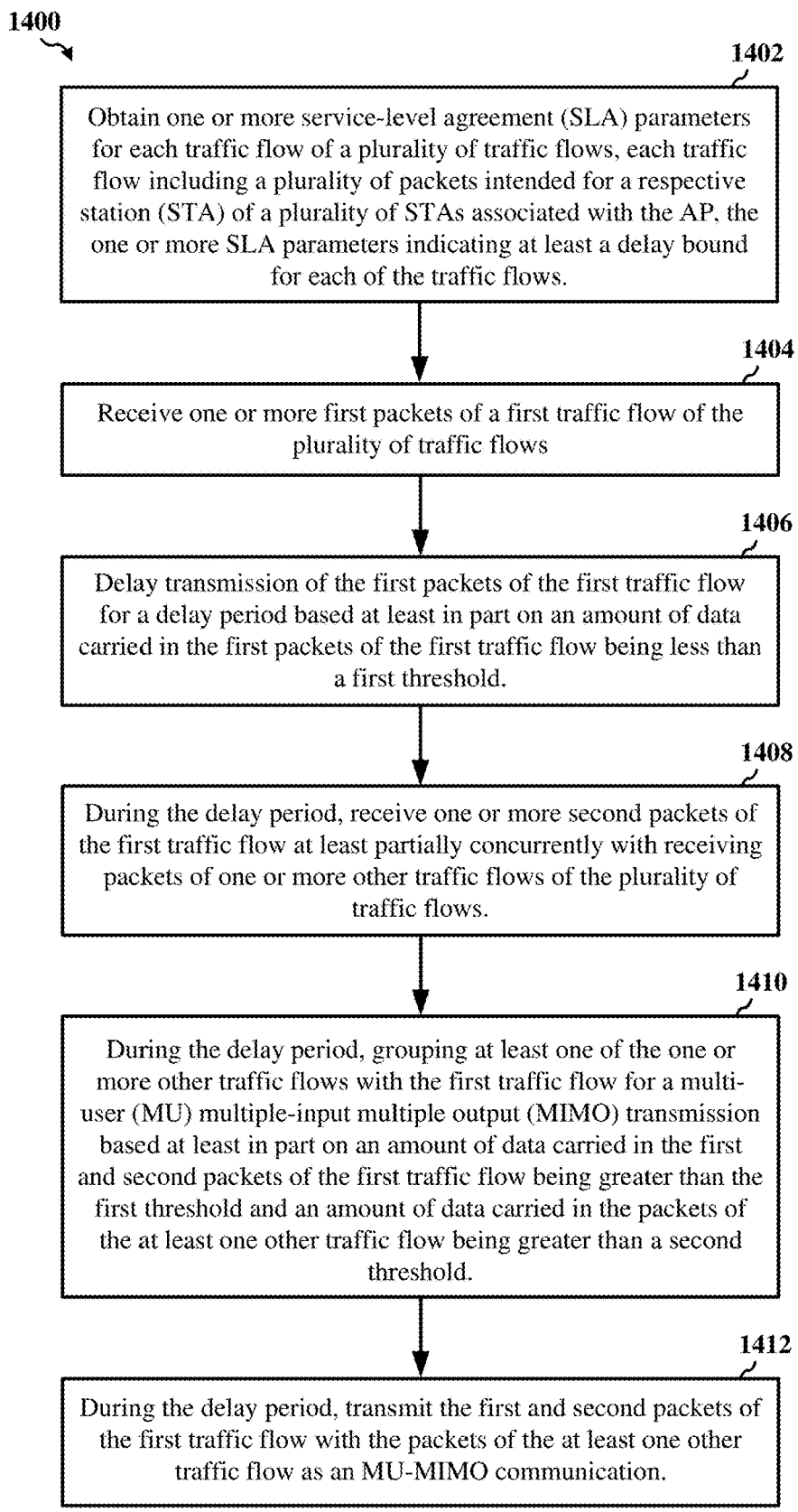
FIG. 14 shows a flowchart illustrating another example operation for wireless communication that supports grouping traffic flows for MU-MIMO communications, according to some implementations.

FIG. 14 shows a flowchart illustrating an example operation 1400 for wireless communication that supports selectively grouping traffic flows for MU-MIMO communications, according to some implementations. The operation 1400 may be performed by a wireless device such as the wireless communication device 500 described above with reference to FIG. 5. In some instances, the operation 1400 may be performed by a wireless device operating as or within an AP, such as one of the APs 102, 602, or 720 described above with reference to FIGS. 1, 6A, and 7, respectively.

For example, at 1402, the wireless device obtains one or more service-level agreement (SLA) parameters for each traffic flow of a plurality of traffic flows, each traffic flow including a plurality of packets intended for a respective station (STA) of a plurality of STAs associated with the AP, the one or more SLA parameters indicating at least a delay bound for each of the traffic flows. At 1404, the wireless device receives one or more first packets of a first traffic flow of the plurality of traffic flows. At 1406, the wireless device delays transmission of the first packets of the first traffic flow for a delay period based at least in part on an amount of data carried in the first packets of the first traffic flow being less than a first threshold. At 1408, the wireless device receives, during the delay period, one or more second packets of the first traffic flow while also receiving packets of a second traffic flow of the plurality of traffic flows. At 1410, the wireless device groups, during the delay period, the second traffic flow with the first traffic flow for a multi-user (MU) multiple-input multiple-output (MIMO) transmission based at least in part on an amount of data carried in the first and second packets of the first traffic flow being greater than the first threshold and an amount of data carried in the packets of the second traffic flow being greater than a second threshold. At 1412, the wireless device transmits, during the delay period, the first and second packets of the first traffic flow with the packets of the second traffic flow as an MU-MIMO communication.

In various implementations, the one or more SLA parameters may be obtained by a host layer or user space of the AP, and the transmission of the first packets of the first traffic flow may be delayed by a wireless local area network (WLAN) subsystem of the AP. In some implementations, grouping the second traffic flow with the first traffic flow includes selecting the second traffic flow as a candidate for the MU-MIMO transmission based on the amount of data carried in the packets of the second traffic flow exceeding the second threshold prior to expiration of the delay period.

Figure 15A:
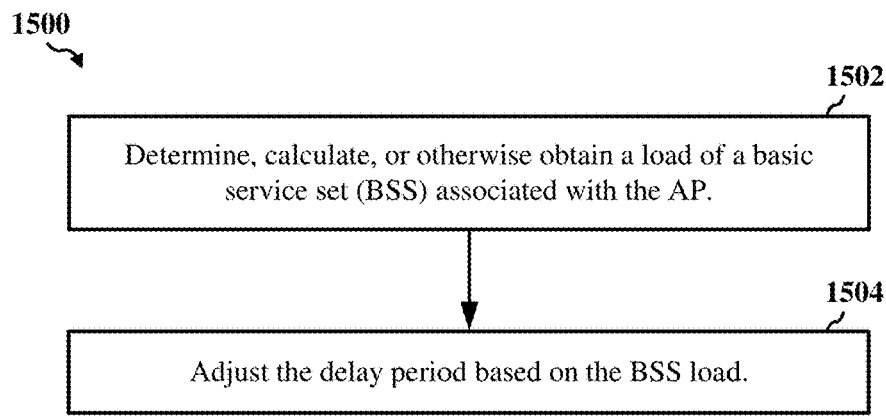
FIGS. 15A-15D show flowcharts illustrating example operations for wireless communication that supports grouping traffic flows for MU-MIMO communications, according to some implementations.

FIG. 15A shows a flowchart illustrating another example 1500 operation for wireless communication that supports selectively grouping traffic flows for MU-MIMO communications, according to some implementations. The operation 1500 may be performed by a wireless device such as the wireless communication device 500 described above with reference to FIG. 5. In some implementations, the operation 1500 may be performed by a wireless device operating as or within an AP, such as one of the APs 102, 602, or 720 described above with reference to FIGS. 1, 6A, and 7, respectively. In some instances, the operation 1500 may be performed prior to the delay period described with reference to FIG. 14. For example, at 1502, the wireless device determines, calculates, or otherwise obtains a load of a basic service set (BSS) associated with the AP. At 1504, the wireless device adjusts the delay period based on the BSS load. In various implementations, the BSS load may be obtained by a host layer or user space of the wireless device, and the delay period may be adjusted by a wireless local area network (WLAN) subsystem of the wireless device based on an indication provided by the host layer or user space.

In some implementations, the adjusted delay period is between zero and the delay bound for the first traffic flow. In some instances, the wireless device increases the delay period based on the BSS load being less than a value. In other instances, the wireless device decreases the delay period based on the BSS load being greater than the value. In some other instances, the wireless device sets the delay period to zero based on the BSS load being greater than a configured amount. As discussed, setting the delay period to zero prevents delaying the transmission of queued packets associated with the first traffic flow for possible MU-MIMO grouping with one or more other traffic flows. In some aspects, the wireless device may transmit the queued packets associated with the first traffic flow as an OFDMA communication. In other aspects, the wireless device may transmit the queued packets associated with the first traffic flow as an SU-MIMO communication.

Figure 15B:
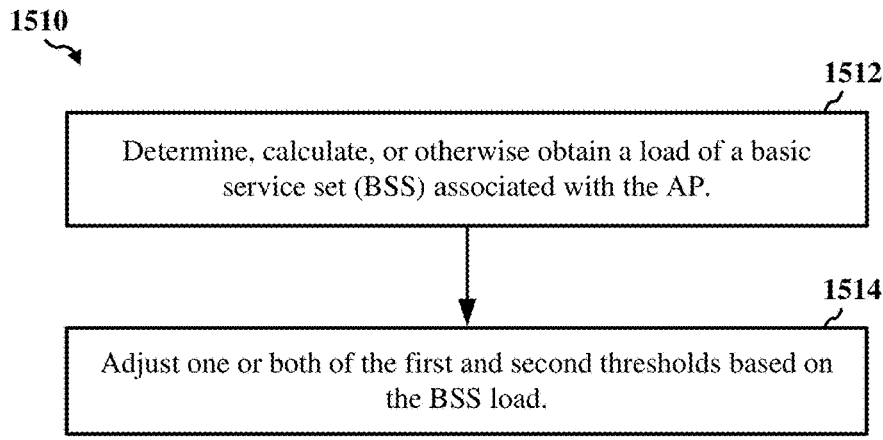

FIG. 15B shows a flowchart illustrating another example 1510 operation for wireless communication that supports selectively grouping traffic flows for MU-MIMO communications, according to some implementations. The operation 1510 may be performed by a wireless device such as the wireless communication device 500 described above with reference to FIG. 5. In some implementations, the operation 1510 may be performed by a wireless device operating as or within an AP, such as one of the APs 102, 602, or 720 described above with reference to FIGS. 1, 6A, and 7, respectively. In some instances, the operation 1510 may be performed prior to the delay period described with reference to FIG. 14. For example, at 1512, the wireless device determines, calculates, or otherwise obtains a load of a basic service set (BSS) associated with the AP. At 1514, the wireless device adjusts one or both of the first and second thresholds based on the BSS load.

In various implementations, the BSS load may be determined, calculated, or otherwise obtained by a host layer or user space of the wireless device, and the delay period may be adjusted by a WLAN subsystem of the wireless device based on an indication provided by the host layer or user space. In some instances, the wireless device may decrease one or both of the first and second thresholds based on the BSS load being less than a value. In other instances, the wireless device may increase one or both of the first and second thresholds based on the BSS load being greater than the value.

Figure 15C:
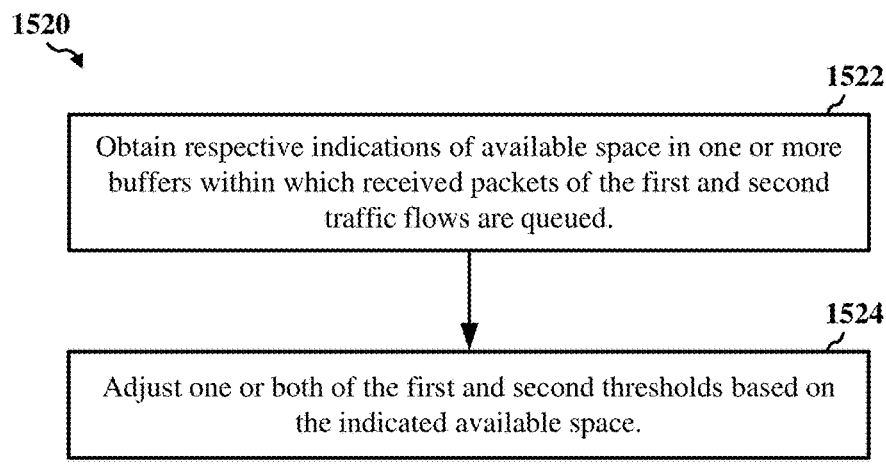

FIG. 15C shows a flowchart illustrating another example 1520 operation for wireless communication that supports selectively grouping traffic flows for MU-MIMO communications, according to some implementations. The operation 1520 may be performed by a wireless device such as the wireless communication device 500 described above with reference to FIG. 5. In some implementations, the operation 1520 may be performed by a wireless device operating as or within an AP, such as one of the APs 102, 602, or 720 described above with reference to FIGS. 1, 6A, and 7, respectively. In some instances, the operation 1520 may be performed prior to the delay period described with reference to FIG. 14. For example, at 1522, the wireless device obtains respective indications of available space in one or more buffers within which received packets of the first and second traffic flows are queued. At 1524, the wireless device adjusts one or both of the first and second thresholds based on the indicated available space.

In various implementations, the indications of available space in the one or more buffers may be determined, calculated, or otherwise obtained by a host layer or user space of the wireless device, and the delay period may be adjusted by a WLAN subsystem of the wireless device based on an indication provided by the host layer or user space. In some instances, the wireless device may decrease one or both of the first and second thresholds based on the indicated available space being less than a value. In other instances, the wireless device may increase one or both of the first and second thresholds based on the indicated available space being greater than the value.

Figure 15D:
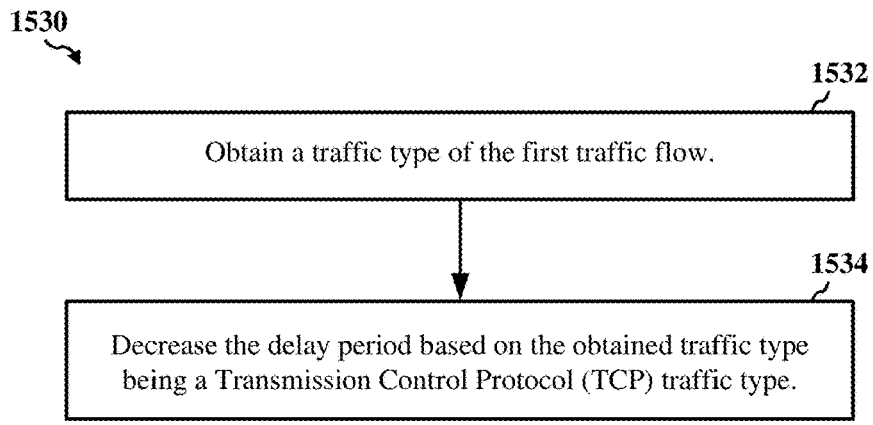

FIG. 15D shows a flowchart illustrating another example 1530 operation for wireless communication that supports selectively grouping traffic flows for MU-MIMO communications, according to some implementations. The operation 1530 may be performed by a wireless device such as the wireless communication device 500 described above with reference to FIG. 5. In some implementations, the operation 1530 may be performed by a wireless device operating as or within an AP, such as one of the APs 102, 602, or 720 described above with reference to FIGS. 1, 6A, and 7, respectively. In some instances, the operation 1530 may be performed prior to the delay period described with reference to FIG. 14. For example, at 1532, the wireless device obtains a traffic type of the first traffic flow. At 1534, the wireless device decreases the delay period based on the obtained traffic type being a Transmission Control Protocol (TCP) traffic type. In some other implementations, the wireless device may disable UL MU trigger frames for TCP traffic and/or other bidirectional traffic when UL traffic is transmitted using UL SU communications. In this way, aspects of the present disclosure may ensure that UL MU trigger frames do not unnecessarily consume the AP's channel access for delivery of DL TCP traffic.

Figure 16A:
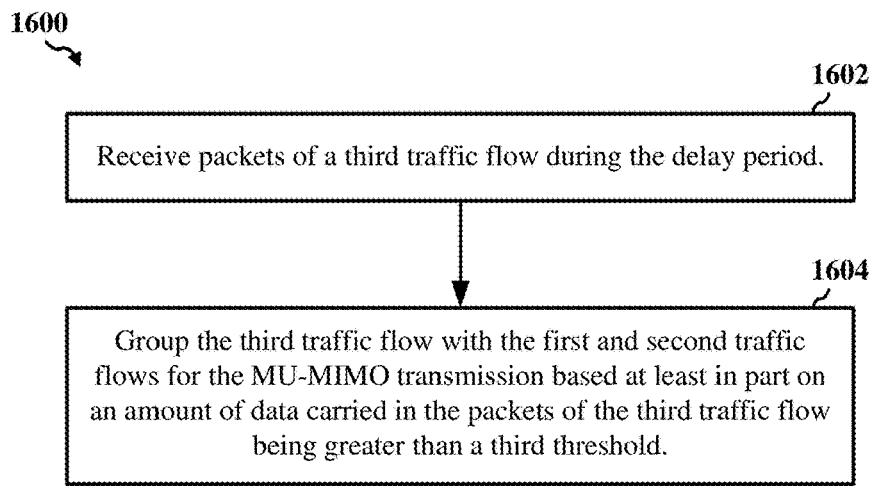
FIGS. 16A-16D show flowcharts illustrating example operations for wireless communication that supports selectively grouping traffic flows for MU-MIMO communications, according to some implementations.

FIG. 16A shows a flowchart illustrating another example 1600 operation for wireless communication that supports selectively grouping traffic flows for MU-MIMO communications, according to some implementations. The operation 1600 may be performed by a wireless device such as the wireless communication device 500 described above with reference to FIG. 5. In some implementations, the operation 1600 may be performed by a wireless device operating as or within an AP, such as one of the APs 102, 602, or 720 described above with reference to FIGS. 1, 6A, and 7, respectively. In some instances, the operation 1600 may be performed during the delay period described with reference to FIG. 14. For example, at 1602, the wireless device receives packets of a third traffic flow during the delay period. At 1604, the wireless device groups the third traffic flow with the first and second traffic flows for the MU-MIMO transmission based at least in part on an amount of data carried in the packets of the third traffic flow being greater than a third threshold. In some implementations, the packets of the third traffic flow are transmitted with the packets of the first and second traffic flows as the MU-MIMO communication.

Figure 16B:
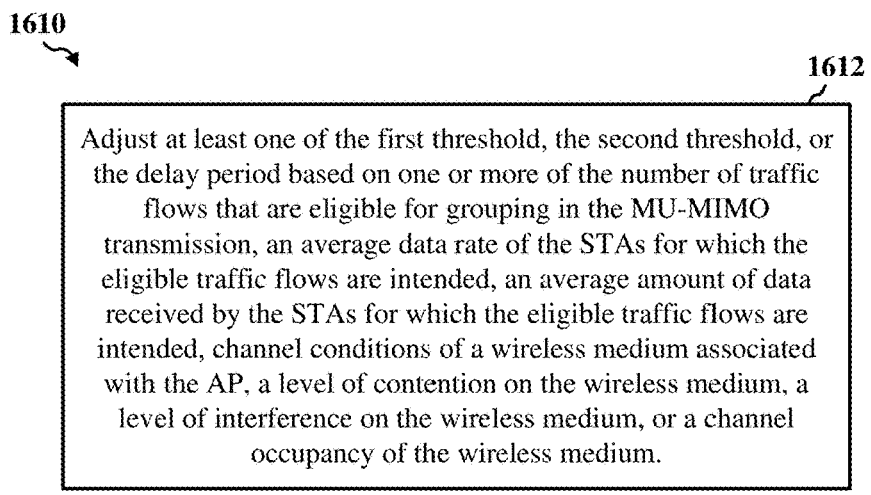

FIG. 16B shows a flowchart illustrating another example 1610 operation for wireless communication that supports selectively grouping traffic flows for MU-MIMO communications, according to some implementations. The operation 1610 may be performed by a wireless device such as the wireless communication device 500 described above with reference to FIG. 5. In some implementations, the operation 1610 may be performed by a wireless device operating as or within an AP, such as one of the APs 102, 602, or 720 described above with reference to FIGS. 1, 6A, and 7, respectively. In some instances, the operation 1610 may be performed prior to the delay period described with reference to FIG. 14. For example, at 1612, the wireless device adjusts at least one of the first threshold, the second threshold, or the delay period based on one or more of the number of traffic flows that are eligible for grouping in the MU-MIMO transmission, an average data rate of the STAs for which the eligible traffic flows are intended, an average amount of data received by the STAs for which the eligible traffic flows are intended, channel conditions of a wireless medium associated with the AP, a level of contention on the wireless medium, a level of interference on the wireless medium, or a channel occupancy of the wireless medium.

Figure 16C:
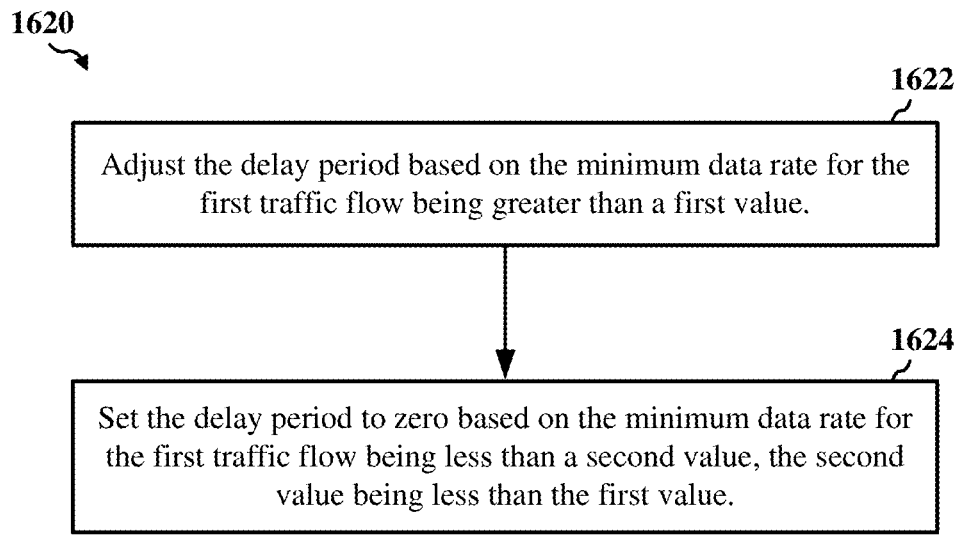

FIG. 16C shows a flowchart illustrating another example 1620 operation for wireless communication that supports selectively grouping traffic flows for MU-MIMO communications, according to some implementations. The operation 1620 may be performed by a wireless device such as the wireless communication device 500 described above with reference to FIG. 5. In some implementations, the operation 1620 may be performed by a wireless device operating as or within an AP, such as one of the APs 102, 602, or 720 described above with reference to FIGS. 1, 6A, and 7, respectively. In various aspects, the operation 1620 may be performed prior to the delay period described with reference to FIG. 14.

In some instances, the wireless device adjusts the delay period based on the minimum data rate for the first traffic flow being greater than a first value, at 1622. In other instances, the wireless device sets the delay period to zero based on the minimum data rate for the first traffic flow being less than a second value, the second value being less than the first value, at 1624. As discussed, setting the delay period to zero prevents delaying the transmission of queued packets associated with the first traffic flow for possible MU-MIMO grouping with one or more other traffic flows. In some aspects, the wireless device may transmit the queued packets associated with the first traffic flow as an OFDMA communication. In other aspects, the wireless device may transmit the queued packets associated with the first traffic flow as an SU-MIMO communication.

Figure 16D:
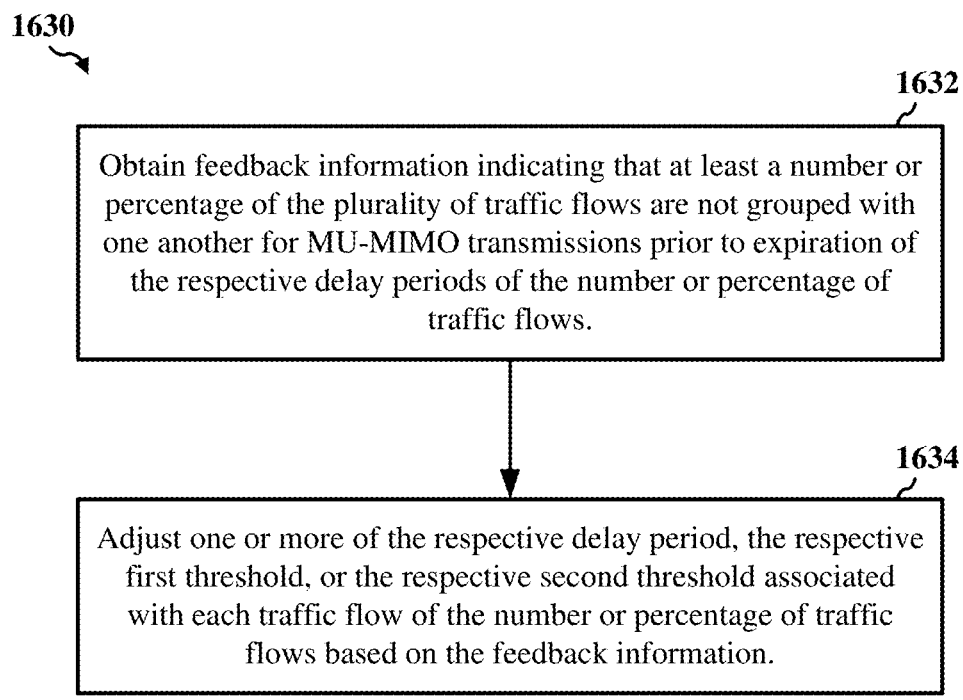

FIG. 16D shows a flowchart illustrating another example 1630 operation for wireless communication that supports selectively grouping traffic flows for MU-MIMO communications, according to some implementations. The operation 1630 may be performed by a wireless device such as the wireless communication device 500 described above with reference to FIG. 5. In some implementations, the operation 1630 may be performed by a wireless device operating as or within an AP, such as one of the APs 102, 602, or 720 described above with reference to FIGS. 1, 6A, and 7, respectively.

In various aspects, the operation 1630 may be performed after the operation 1400 described with reference to FIG. 14. For example, at 1632, the wireless device obtains feedback information indicating that at least a number or percentage of the plurality of traffic flows are not grouped with one another for MU-MIMO transmissions prior to expiration of the respective delay periods of the number or percentage of traffic flows. At 1634, the wireless device adjusts one or more of the respective delay period, the respective first threshold, or the respective second threshold associated with each traffic flow of the number or percentage of traffic flows based on the feedback information.

Figure 17:
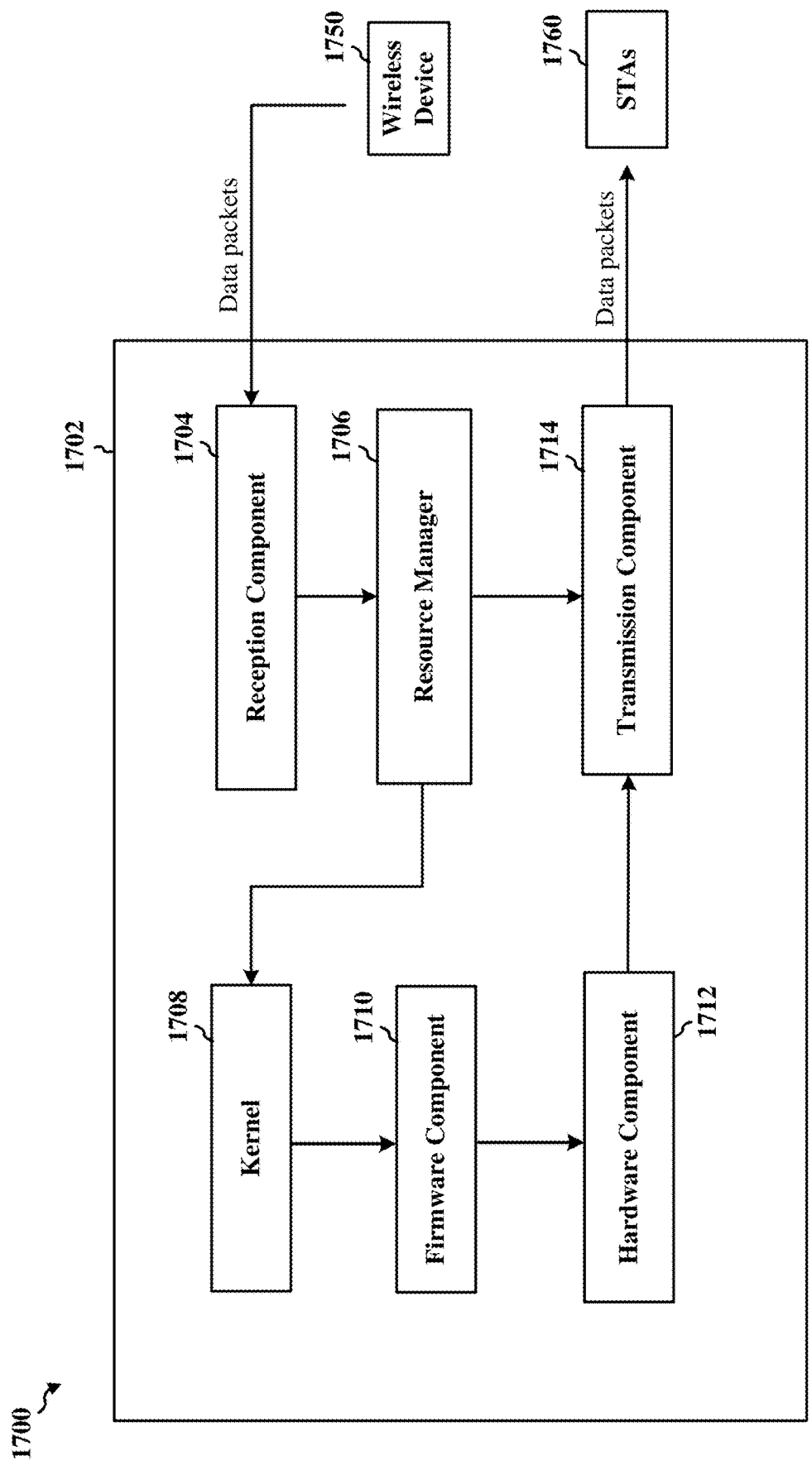
FIG. 17 shows a conceptual data flow diagram illustrating the data flow between different means/components in an example apparatus.

FIG. 17 is a conceptual data flow diagram 1700 illustrating the data flow between different means and/or components of an example apparatus 1702. In some implementations, the apparatus 1702 may be implemented within an AP. In some other implementations, the apparatus 1702 may be a wireless device that operates as a STA associated with a WLAN while also operating as a softAP associated with one or more client devices (not shown for simplicity). The apparatus 1702 includes a reception component 1704 that receives data packets from another wireless device 1750. In some aspects, the reception component 1704 may also receive or obtain feedback information from one or more wireless networks, traffic flow attributes of the traffic flows communicated over at least some of the one or more wireless networks, and SLA parameters associated with the traffic flows. The apparatus 1702 also includes a resource manager 1706, a kernel 1708, a firmware component 1710, a hardware component 1712, and a transmission component 1714.

The resource manager 1706 may determine whether or not to enable MU communications for each traffic flow received by the apparatus 1702 based on one or more SLA parameters, one or more traffic flow attributes, one or more network parameters of the BSS that includes the apparatus 1702, one or more network parameters of other BSSs, or any combination thereof. In some aspects, at least some of the traffic flow attributes and network parameters may be provided by an operator cloud based on the slow control loop 706 described with reference to FIG. 7. In some implementations, the resource manager 1706 may provide an indication of whether each traffic flow is suitable for transmission over the wireless medium as an SU-MIMO communication, as an MU-MIMO communication, as an OFDMA communication, or as a partial BW MU-MIMO communication based on one or more of the SLA parameters, the traffic flow attributes, or the network parameters. In some aspects, the resource manager 1706 may provide the indication to the firmware component 1710 based on the mid control loop 704 described with reference to FIG. 7. The kernel 1708 may facilitate interactions between hardware and software components of the apparatus 1702. The firmware component 1710 may schedule transmissions of the traffic flows based on the indications provided by the resource manager 1706. In some aspects, the firmware component 1710 may indicate whether the hardware component 1712 is to group queued packets associated with different traffic flows for concurrent transmission over the wireless medium using MU-MIMO, OFDMA, or partial BW MU-MIMO. The hardware component 1712 may include processing and communication cores that control various aspects of the transmission component 1714. In some aspects, the hardware component 1712 may be based on the fast control loop 702 described with reference to FIG. 7.

The transmission component 1714 is coupled to the resource manager 1706 and the hardware component 1712, may be used to transmit frames or packets provided by the hardware component 1712 to other wireless communication devices. The transmission component 1714 may include PHY components, such as transceivers, which are responsible for transmitting packets of the traffic flows over the wireless medium to their intended receiving devices. In some instances, the transmission component 1714 may concurrently transmit multiple traffic flows over the wireless medium based on MU-MIMO, OFDMA, or partial BW MU-MIMO. In other instances, the transmission component 1714 may transmit traffic flows over the wireless medium based on SU-MIMO.

The apparatus 1702 may include additional components that perform each of the blocks of the operations described with reference to FIGS. 11, 12, and 13A-13D. As such, each block in the flowcharts of FIGS. 11, 12, and 13A-13D may be performed by a component, and the apparatus 1702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
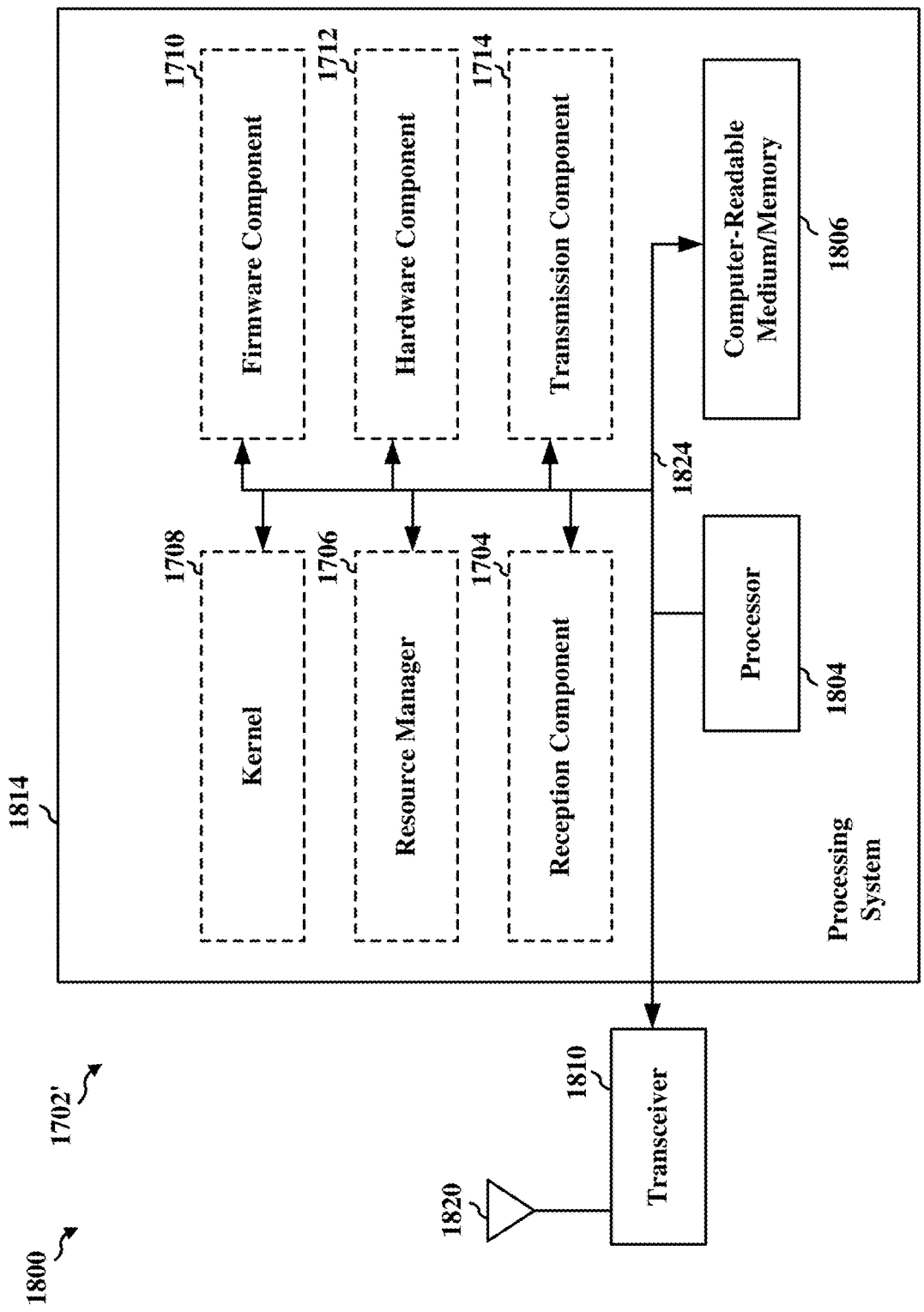
FIG. 18 shows a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, and 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1714, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, and 1712. The components may be software components running in the processor 1804, resident/stored in the computer readable medium/memory 1806, one or more hardware components coupled to the processor 1804, or some combination thereof.

In certain configurations, the apparatus 1702/1702' for wireless communication may include means for all means limitations described herein. The aforementioned means may be the modem 502, the radio 504, the processor(s) 506, the memory 508, and one or more of the aforementioned components of the apparatus 1702 and/or the processing system 1814 of the apparatus 1702' configured to perform the functions recited by the aforementioned means. The aforementioned means may be one or more of the aforementioned components of the apparatus 1802 and/or the processing system 1814 of the apparatus 1702' configured to perform the functions recited by the aforementioned means. As described supra, the processing system 1814 may include modem 502, the radio 504, the processor(s) 506, the memory 508 of FIG. 5.

In some examples, means for obtaining one or more packets associated with a traffic flow may include the modem 502 and radio 504 of FIG. 5, the wireless communication device 610 and antennas 620 of FIG. 6A, the hardware 728 of FIG. 7, or the transceiver 1810 and antennas 1820 of FIG. 18.

In some examples, means for obtaining SLA parameters, traffic flow attributes, or network parameters may include the modem 502 and radio 504 of FIG. 5, the wireless communication device 610 and antennas 620 of FIG. 6A, the hardware 728 of FIG. 7, or the transceiver 1810 and antennas 1820 of FIG. 18.

In some examples, means for providing indications of whether the traffic flow is suitable for transmission over a wireless medium as an SU-MIMO communication, as an MU-MIMO communication, as an OFDMA communication, or as a partial bandwidth BW MU-MIMO communication may include the resource manager 722 of FIG. 7 or the resource manager 1706 of FIG. 18.

In some examples, means for initiating transmission of the one or more packets over the wireless medium may include the modem 502 and radio 504 of FIG. 5, the wireless communication device 610 and antennas 620 of FIG. 6A, the hardware 728 of FIG. 7, or the transceiver 1810 and antennas 1820 of FIG. 18.

In some examples, means for assigning and/or selecting a transmission mode may include the resource manager 722 of FIG. 7 or the resource manager 1706 of FIG. 18.

Example Aspects

Aspect 1: A method for wireless communication at an access point (AP), including: obtaining one or more packets associated with a traffic flow; obtaining at least one of one or more service-level agreement (SLA) parameters associated with the traffic flow, one or more attributes of the traffic flow, or one or more network parameters associated with a basic service set (BSS) that includes the AP; providing an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as an MU-OFDMA communication, the indication being based on one or more of the SLA parameters, the traffic flow attributes, or the network parameters; and initiating transmission of the one or more packets over the wireless medium based on the indication.

Aspect 2: The method of aspect 1, further including: assigning a transmission mode to each packet queue associated with the traffic flow, the transmission mode being one of SU-MIMO, MU-MIMO, OFDMA, or partial BW MU-MIMO based on the indication.

Aspect 3: The method of any of aspects 1-2, further including: selecting a transmission mode for the WLAN subsystem based on the indication.

Aspect 4: The method of any of aspects 1-3, further including: outputting for transmission the one or more packets as an MU-MIMO transmission based on the traffic flow being associated with latency-sensitive traffic and an amount of payload data carried by the one or more packets being at least equal to a threshold; or outputting for transmission the one or more packets as an OFDMA transmission based on the traffic flow being associated with latency-sensitive traffic and the amount of payload data carried by the one or more packets being less than the threshold.

Aspect 5: The method of any of aspects 1-4, further including: outputting for transmission the one or more packets as an MU-OFDMA transmission based on the traffic flow being associated with latency-sensitive traffic and the number of active latency-sensitive traffic flows being at least equal to a threshold number of traffic flows; or outputting for transmission the one or more packets as an MU-MIMO transmission based on the traffic flow not being associated with latency-sensitive traffic and carrying more than a specified amount of data.

Aspect 6: The method of any of aspects 1-5, wherein the SLA parameters include one or more of a minimum data rate, a maximum delay bound, a service interval, a burst size, or a throughput requirement for traffic flows associated with the SLA.

Aspect 7: The method of any of aspects 1-6, further including outputting for transmission the one or more packets as an MU-MIMO transmission based at least in part on the maximum delay bound being at least equal to a delay threshold, the throughput requirement being at least equal to a throughput threshold, or both; or outputting for transmission the one or more packets as an OFDMA transmission based at least in part on the maximum delay bound being less than the delay threshold, the throughput requirement being less than the throughput threshold, or both.

Aspect 8: The method of aspect 7, wherein: outputting the one or more packets for transmission as the MU-MIMO transmission is further based on the minimum data rate being at least equal to a data rate threshold; or outputting the one or more packets for transmission as the OFDMA transmission is further based on the minimum data rate being less than the data rate threshold.

Aspect 9: The method of any of aspects 1-8, wherein the network parameters include one or more of interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium.

Aspect 10: The method of aspect 9, further including: outputting for transmission the one or more packets as an MU-MIMO transmission based at least in part on the interference levels being less than an interference threshold, the level of channel delay spread being less than a threshold amount, or both; or outputting for transmission the one or more packets as an OFDMA transmission based at least in part on the interference levels being at least equal to the interference threshold, the level of channel delay spread being at least equal to the threshold amount, or both.

Aspect 11: The method of aspect 10, wherein: outputting the one or more packets for transmission as the MU-MIMO transmission is further based on the number or percentage of active STAs that support MU-MIMO communications being at least equal to a first amount and the number of active STAs being less than a second amount; or outputting the one or more packets for transmission as the SU-MIMO or OFDMA transmission is further based on the number or percentage of active STAs that support MU-MIMO communications being less than the first amount and the number of associated STAs being at least equal to the second amount.

Aspect 12: The method of any of aspects 1-11, wherein the traffic flow attributes include one or more of a data rate of the traffic flow, an average burst size of the traffic flow, or interarrival times of the one or more packets associated with the traffic flow.

Aspect 13: The method of aspect 12, further including: outputting for transmission the one or more packets as an MU-MIMO transmission based on the respective interarrival times being offset in time from each other by less than a threshold time period and the average burst size being greater than a burst size threshold; or outputting for transmission the one or more packets as an SU-MIMO or OFDMA transmission based on the respective interarrival times being offset in time from each other by more than the threshold time period and the average burst size being less than the burst size threshold.

Aspect 14: The method of aspect 13, wherein: outputting the one or more packets for transmission as the MU-MIMO transmission is further based on the data rate being at least equal to a data rate threshold; or outputting the one or more packets for transmission as the SU-MIMO or OFDMA transmission is further based on the data rate being less than the data rate threshold.

Aspect 15: The method of any of aspects 1-14, further including implementing a first timing loop and a second timing loop, the first timing loop being between approximately 1 and 100 milliseconds, the second timing loop being between approximately 1 and 5 seconds.

Aspect 16: The method of aspect 15, further including obtaining the network parameters and the traffic flow attributes from an external source based on a third timing loop, the third timing loop being between approximately 10 and 60 seconds.

Aspect 17: An access point (AP), including: at least one transceiver; a memory including instructions; and one or more processors configured to execute the instructions and cause the AP to perform a method in accordance with any one of Aspects 1-16, wherein the at least one transceiver is configured to receive one or more packets associated with a traffic flow and to transmit the one or more packets over a wireless medium.

Aspect 18: An apparatus for wireless communications, including means for performing a method in accordance with any one of Aspects 1-16.

Aspect 19: A non-transitory computer-readable storage medium storing instructions that, when executed by one or more processors of an apparatus, cause the apparatus to perform one or more operations in accordance with any one of Aspects 1-16.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communications, comprising:
a processing system that includes one or more processors and memory that stores instructions, wherein the processing system is configured to cause the apparatus to:
obtain one or more packets associated with a traffic flow;
obtain at least one of one or more service-level agreement (SLA) parameters associated with the traffic flow, one or more attributes of the traffic flow, or one or more network parameters associated with a basic service set (BSS) that includes the apparatus;
provide an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) MU-MIMO communication, the indication being based on one or more of the one or more SLA parameters, the one or more attributes of the traffic flow, or the one or more network parameters; and
initiate transmission of the one or more packets over the wireless medium based on the indication, wherein the processing system is further configured to cause the apparatus to:
output for transmission the one or more packets as a partial BW MU-MIMO transmission based on the traffic flow being associated with latency-sensitive traffic and a number of active latency-sensitive traffic flows being at least equal to a threshold number of traffic flows; or
output for transmission the one or more packets as an MU-MIMO transmission based on the traffic flow not being associated with latency-sensitive traffic and carrying more than a specified amount of data.

2. The apparatus of claim 1, wherein the processing system is further configured to cause the apparatus to:
assign a transmission mode to each packet queue associated with the traffic flow, the transmission mode being one of SU-MIMO, MU-MIMO, OFDMA, or partial BW MU-MIMO based on the indication.

3. The apparatus of claim 1, wherein the processing system is further configured to cause the apparatus to:
select a transmission mode for the one or more packets based on the indication.

4. The apparatus of claim 1, wherein the one or more SLA parameters include one or more of a minimum data rate, a maximum delay bound, a service interval, a burst size, or a throughput requirement for traffic flows associated with an SLA.

5. The apparatus of claim 1, wherein the one or more network parameters include one or more of one or more interference levels on the wireless medium, a level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium.

6. The apparatus of claim 1, wherein the one or more attributes of the traffic flow include one or more of a data rate of the traffic flow, an average burst size of the traffic flow, or interarrival times of the one or more packets associated with the traffic flow.

7. The apparatus of claim 1, wherein a resource manager of the apparatus provides the indication to a wireless local area network (WLAN) subsystem of the apparatus, and wherein the resource manager implements a first timing loop, the WLAN subsystem implements a second timing loop, the first timing loop is between approximately 1 and 100 milliseconds, and the second timing loop is between approximately 1 and 5 seconds.

8. The apparatus of claim 7, wherein the resource manager obtains the one or more network parameters and the one or more attributes of the traffic flow from an external source based on a third timing loop, and the third timing loop is between approximately 10 and 60 seconds.

9. The apparatus of claim 1, further comprising a transceiver configured to transmit the one or more packets over the wireless medium, wherein the apparatus is configured as an access point (AP) associated with the BSS.

10. A method for wireless communication at an access point (AP), comprising:
obtaining one or more packets associated with a traffic flow;
obtaining at least one of one or more service-level agreement (SLA) parameters associated with the traffic flow, one or more attributes of the traffic flow, or one or more network parameters associated with a basic service set (BSS) that includes the AP;
providing an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) MU-MIMO communication, the indication being based on one or more of the one or more SLA parameters, the one or more attributes of the traffic flow, or the one or more network parameters; and
initiating transmission of the one or more packets over the wireless medium based on the indication, the method further comprising:
outputting for transmission the one or more packets as an MU-MIMO transmission based at least in part on interference levels on the wireless medium being less than an interference threshold, a level of channel delay spread associated with the wireless medium being less than a threshold amount, or both; or
outputting for transmission the one or more packets as an OFDMA transmission based at least in part on the interference levels being at least equal to the interference threshold, the level of channel delay spread being at least equal to the threshold amount, or both.

11. The method of claim 10, further comprising:
assigning a transmission mode to each packet queue associated with the traffic flow, the transmission mode being one of SU-MIMO, MU-MIMO, OFDMA, or partial BW MU-MIMO based on the indication.

12. The method of claim 10, further comprising:
selecting a transmission mode for a wireless local area network (WLAN) subsystem based on the indication.

13. The method of claim 10, wherein:
outputting for transmission the one or more packets as the MU-MIMO transmission is based on the traffic flow being associated with latency-sensitive traffic and an amount of payload data carried by the one or more packets being at least equal to a threshold; or
outputting for transmission the one or more packets as the OFDMA transmission is based on the traffic flow being associated with latency-sensitive traffic and the amount of payload data carried by the one or more packets being less than the threshold.

14. The method of claim 10, wherein the one or more SLA parameters include one or more of a minimum data rate, a maximum delay bound, a service interval, a burst size, or a throughput requirement for traffic flows associated with an SLA.

15. The method of claim 14, wherein:
outputting for transmission the one or more packets as the MU-MIMO transmission is based at least in part on the maximum delay bound being at least equal to a delay threshold, the throughput requirement being at least equal to a throughput threshold, or both; or
outputting for transmission the one or more packets as the OFDMA transmission is based at least in part on the maximum delay bound being less than the delay threshold, the throughput requirement being less than the throughput threshold, or both.

16. The method of claim 15, wherein:
outputting the one or more packets for transmission as the MU-MIMO transmission is further based on the minimum data rate being at least equal to a data rate threshold; or
outputting the one or more packets for transmission as the OFDMA transmission is further based on the minimum data rate being less than the data rate threshold.

17. The method of claim 10, wherein the one or more network parameters include one or more of the interference levels on the wireless medium, the level of channel delay spread associated with the wireless medium, a number of associated wireless stations (STAs) that are active, a number or percentage of the active STAs that support MU-MIMO communications, a number or percentage of the active STAs that support partial BW MU-MIMO communications, a number or percentage of the active STAs that support OFDMA communications, one or more service class parameters, or a traffic load on the wireless medium.

18. The method of claim 17, wherein:
outputting the one or more packets for transmission as the MU-MIMO transmission is further based on the number or percentage of active STAs that support MU-MIMO communications being at least equal to a first amount and the number of active STAs being less than a second amount; or
outputting the one or more packets for transmission as the OFDMA transmission is further based on the number or percentage of active STAs that support MU-MIMO communications being less than the first amount and the number of active STAs being at least equal to the second amount.

19. The method of claim 10, wherein the one or more attributes of the traffic flow include one or more of a data rate of the traffic flow, an average burst size of the traffic flow, or respective interarrival times of the one or more packets associated with the traffic flow.

20. The method of claim 19, wherein:
outputting for transmission the one or more packets as the MU-MIMO transmission is based on the respective interarrival times being offset in time from each other by less than a threshold time period and the average burst size being greater than a burst size threshold; or
outputting for transmission the one or more packets as the OFDMA transmission is based on the respective interarrival times being offset in time from each other by more than the threshold time period and the average burst size being less than the burst size threshold.

21. The method of claim 20, wherein:
outputting the one or more packets for transmission as the MU-MIMO transmission is further based on the data rate being at least equal to a data rate threshold; or
outputting the one or more packets for transmission as the OFDMA transmission is further based on the data rate being less than the data rate threshold.

22. An apparatus for wireless communications, comprising:
a processing system that includes one or more processors and memory that stores instructions, wherein the processing system is configured to cause the apparatus to:
obtain one or more packets associated with a traffic flow;
obtain at least one of one or more service-level agreement (SLA) parameters associated with the traffic flow, one or more attributes of the traffic flow, or one or more network parameters associated with a basic service set (BSS) that includes the apparatus;
provide an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) MU-MIMO communication, the indication being based on one or more of the one or more SLA parameters, the one or more attributes of the traffic flow, or the one or more network parameters; and
initiate transmission of the one or more packets over the wireless medium based on the indication, wherein the processing system is further configured to cause the apparatus to:
output for transmission the one or more packets as an MU-MIMO transmission based on respective interarrival times of the one or more packets associated with the traffic flow being offset in time from each other by less than a threshold time period and an average burst size of the traffic flow being at least equal to a burst size threshold; or
output for transmission the one or more packets as an SU-MIMO or OFDMA transmission based on the respective interarrival times being offset in time from each other by more than the threshold time period and the average burst size being less than the burst size threshold.

23. An apparatus for wireless communications, comprising:
a processing system that includes one or more processors and memory that stores instructions, wherein the processing system is configured to cause the apparatus to:
obtain one or more packets associated with a traffic flow;
obtain at least one of one or more service-level agreement (SLA) parameters associated with the traffic flow, one or more attributes of the traffic flow, or one or more network parameters associated with a basic service set (BSS) that includes the apparatus;

provide an indication of whether the traffic flow is suitable for transmission over a wireless medium as a single-user (SU) multiple-input multiple output (MIMO) (SU-MIMO) communication, as a multi-user (MU) MIMO (MU-MIMO) communication, as an orthogonal frequency division multiple access (OFDMA) communication, or as a partial bandwidth (BW) MU-MIMO communication, the indication being based on one or more of the one or more SLA parameters, the one or more attributes of the traffic flow, or the one or more network parameters; and initiate transmission of the one or more packets over the wireless medium based on the indication, wherein:
a resource manager of the apparatus provides the indication to a wireless local area network (WLAN) subsystem of the apparatus, and the resource manager implements a first timing loop, the WLAN subsystem implements a second timing loop, the first timing loop is between approximately 1 and 100 milliseconds, and the second timing loop is between approximately 1 and 5 seconds.

\* \* \* \* \*